(12) United States Patent
Eleazer et al.

(10) Patent No.: US 7,294,384 B2
(45) Date of Patent: *Nov. 13, 2007

(54) MOLDABLE CONSTRUCTION INCORPORATING BONDING INTERFACE

(75) Inventors: Howell Brewster Eleazer, Moore, SC (US); Brian Callaway, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/518,965

(22) Filed: Sep. 11, 2006

(65) Prior Publication Data
US 2007/0071941 A1 Mar. 29, 2007

Related U.S. Application Data

(63) Continuation-in-part of application No. 11/235,941, filed on Sep. 27, 2005.

(51) Int. Cl.
| | |
|---|---|
| *B32B 3/06* | (2006.01) |
| *B32B 5/08* | (2006.01) |
| *B32B 5/12* | (2006.01) |
| *B32B 5/26* | (2006.01) |
| *B32B 7/08* | (2006.01) |
| *B32B 7/10* | (2006.01) |

(52) U.S. Cl. .................... 428/86; 428/96; 428/102; 428/119; 442/186; 442/199; 442/239; 442/255; 442/366

(58) Field of Classification Search .......... 428/86, 428/96, 95, 102, 119; 442/185, 186, 189, 442/192, 195, 199, 239, 246, 255, 263, 366, 442/367, 368, 369
See application file for complete search history.

(56) References Cited

U.S. PATENT DOCUMENTS 4,309,487 A 1/1982 Holmes ................... 428/516

(Continued)

FOREIGN PATENT DOCUMENTS

DE 198 23 926 12/1999

(Continued)

*Primary Examiner*—Cheryl Juska
(74) *Attorney, Agent, or Firm*—Terry T. Moyer; Cheryl J. Brickey

(57) ABSTRACT

A composite construction comprising a mat structure comprising a plurality of layers, each layer comprising plurality of fibers arranged substantially parallel to one another along a common fiber direction, a multiplicity of embedded fiber elements extending in anchored relation at least partially across the thickness dimension of the mat structure such that at least a portion of the embedded fiber elements project outwardly from the mat structure and the projecting portions define at least a partial surface covering across a first side of the mat structure, and a substrate layer disposed in layered relation to the mat structure in contacting, bonding relation with said first side of the mat structure such that at least a percentage of said portion of embedded fiber elements projecting outwardly from the mat structure is at least partially bonded or embedded into a surface portion of the substrate layer. The composite is adapted for bonding to a substrate layer. At least one interface layer disposed in layered relation to a first side of the mat structure may be included. Additional layers comprising plurality of fibers arranged substantially parallel to one another along a common fiber direction may be utilized.

19 Claims, 14 Drawing Sheets

U.S. PATENT DOCUMENTS

| | | | | |
|---|---|---|---|---|
| 4,316,933 A | * | 2/1982 | Fraser | 442/255 |
| 4,426,415 A | * | 1/1984 | Avery | 428/17 |
| 4,705,706 A | * | 11/1987 | Avery | 428/17 |
| 4,980,227 A | | 12/1990 | Sekiguchi et al. | 442/3 |
| 5,077,935 A | * | 1/1992 | Stoever et al. | 47/9 |
| 5,124,195 A | | 6/1992 | Harpell et al. | 428/152 |
| 5,137,393 A | | 8/1992 | Fuhr et al. | 405/129.9 |
| 5,436,064 A | * | 7/1995 | Schnegg et al. | 442/203 |
| 5,437,905 A | | 8/1995 | Park | 428/105 |
| 5,443,882 A | | 8/1995 | Park | 428/103 |
| 5,443,883 A | | 8/1995 | Park | 428/103 |
| 5,529,826 A | * | 6/1996 | Tailor et al. | 428/110 |
| 5,547,536 A | | 8/1996 | Park | 156/292 |
| 5,578,370 A | | 11/1996 | Ferrar et al. | 428/288 |
| 5,635,288 A | | 6/1997 | Park | 428/105 |
| 5,643,390 A | | 7/1997 | Don et al. | 156/307.1 |
| 5,861,202 A | | 1/1999 | Kimura et al. | 428/105 |
| 5,877,096 A | * | 3/1999 | Stevenson et al. | 442/36 |
| 5,879,492 A | * | 3/1999 | Reis et al. | 156/72 |
| 5,891,549 A | * | 4/1999 | Beretta et al. | 428/100 |
| 5,925,434 A | | 7/1999 | Phillips et al. | 428/95 |
| 5,935,651 A | | 8/1999 | Klocek et al. | 427/256 |
| 5,935,678 A | | 8/1999 | Park | 428/105 |
| 5,962,101 A | * | 10/1999 | Irwin et al. | 428/92 |
| 6,054,086 A | | 4/2000 | Kurihara et al. | 264/147 |
| 6,083,583 A | | 7/2000 | Klocek et al. | 428/182 |
| 6,127,293 A | | 10/2000 | Kimura et al. | 442/199 |
| 6,156,679 A | | 12/2000 | Takaoka et al. | 442/327 |
| 6,312,638 B1 | | 11/2001 | Ward et al. | 264/322 |
| 6,328,923 B1 | | 12/2001 | Jones et al. | 264/494 |
| 6,458,727 B1 | | 10/2002 | Jones et al. | 442/409 |
| 6,475,592 B1 | * | 11/2002 | Irwin | 428/95 |
| 6,479,125 B1 | * | 11/2002 | Irwin, Sr. | 428/95 |
| 6,509,105 B2 | | 1/2003 | Olvey | 428/481 |
| 6,645,610 B1 | * | 11/2003 | Reis et al. | 428/297.4 |
| 6,740,386 B2 | * | 5/2004 | Hutchison | 428/88 |
| 6,824,863 B1 | | 11/2004 | Kitayama et al. | 428/299.7 |
| 6,866,912 B2 | * | 3/2005 | Higgins et al. | 428/95 |
| 6,897,170 B2 | * | 5/2005 | Barkis et al. | 442/195 |
| 6,949,280 B2 | | 9/2005 | Brillhart, III et al. | 428/105 |
| 7,160,599 B2 | * | 1/2007 | Hartman | 428/95 |
| 2003/0175474 A1 | * | 9/2003 | Higgins et al. | 428/95 |
| 2003/0175475 A1 | * | 9/2003 | Higgins et al. | 428/95 |
| 2003/0178122 A1 | * | 9/2003 | Ianniello et al. | 156/71 |
| 2003/0224143 A1 | * | 12/2003 | Ianniello et al. | 428/137 |
| 2004/0242103 A1 | | 12/2004 | Loos et al. | 442/185 |
| 2005/0003727 A1 | | 1/2005 | Chiou | 442/239 |
| 2005/0233107 A1 | * | 10/2005 | Hartman | 428/95 |
| 2006/0151104 A1 | | 7/2006 | Jacobs et al. | 156/308.2 |
| 2007/0071940 A1 | * | 3/2007 | Callaway et al. | 428/92 |
| 2007/0071941 A1 | * | 3/2007 | Eleazer et al. | 428/92 |
| 2007/0071942 A1 | * | 3/2007 | Callaway et al. | 428/95 |
| 2007/0122586 A1 | * | 5/2007 | Hartman | 428/95 |

FOREIGN PATENT DOCUMENTS

| | | |
|---|---|---|
| EP | 0 344 318 | 12/1989 |
| EP | 0 733 460 | 9/1996 |
| EP | 0 733 476 | 9/1996 |
| EP | 0 872 586 | 10/1998 |
| EP | 1 21 338 | 6/2002 |
| EP | 1 650 021 | 4/2006 |
| GB | 1 387 701 | 3/1975 |
| JP | 62 90317 | 4/1987 |
| JP | 07300763 | 11/1995 |
| JP | 10 251956 | 9/1998 |
| JP | 2000008244 | 1/2000 |
| WO | WO 98/12370 | 3/1998 |
| WO | WO 98/12371 | 3/1998 |
| WO | WO 2002090082 | 11/2002 |
| WO | WO 2003008190 | 1/2003 |
| WO | WO 2003045659 | 6/2003 |
| WO | WO 2004028803 | 4/2004 |
| WO | WO 2006046862 | 5/2006 |

* cited by examiner

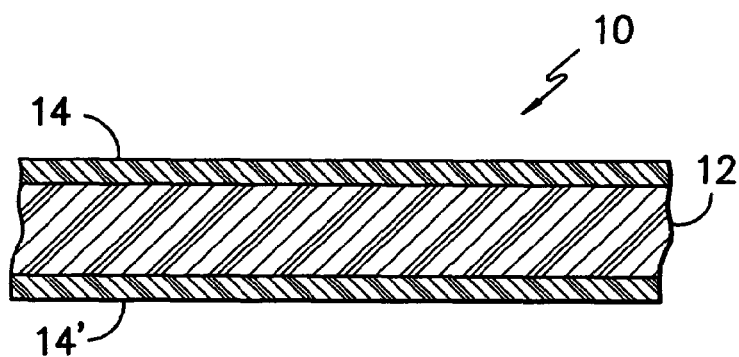
FIG. -1A-
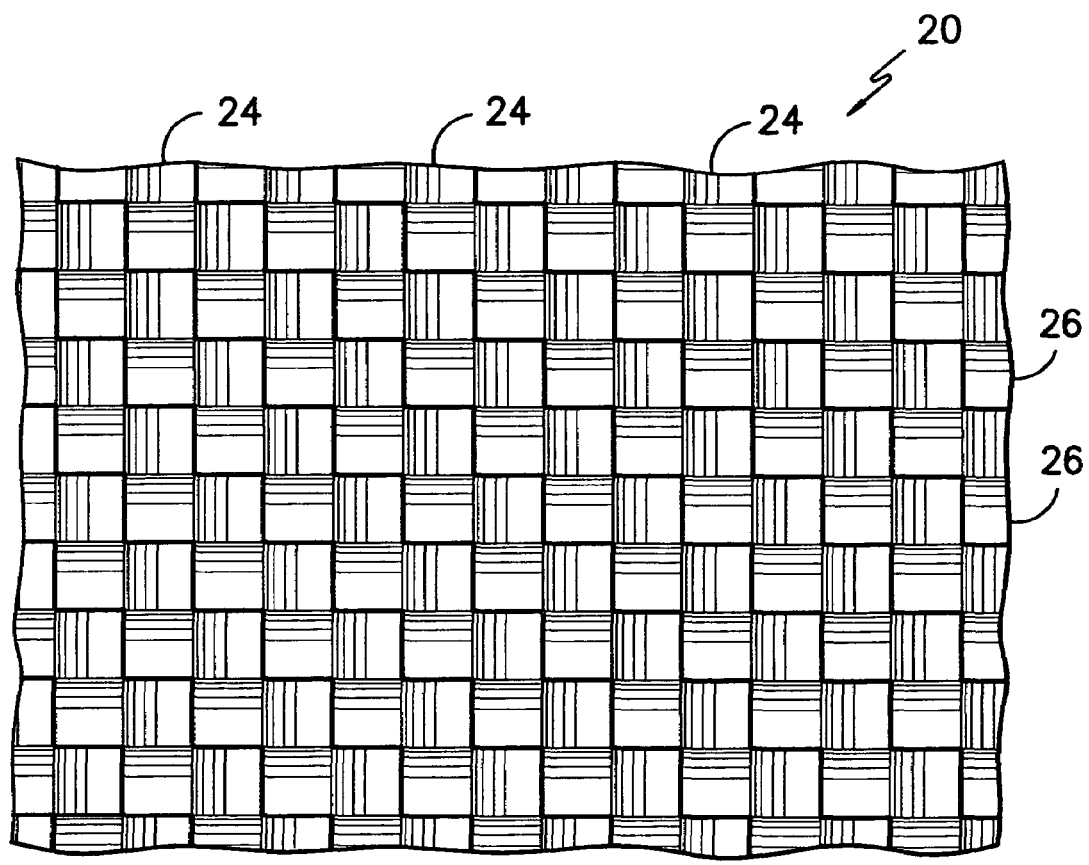
FIG. -1B-

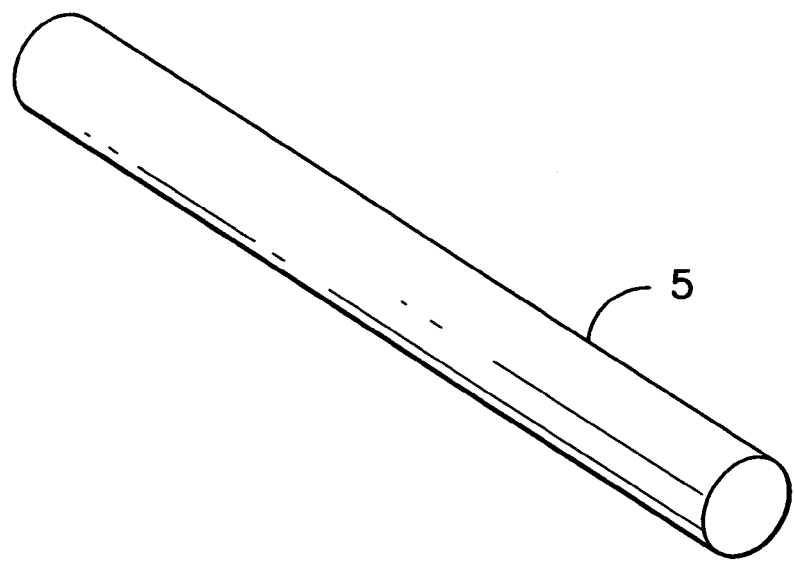
FIG. -2A-
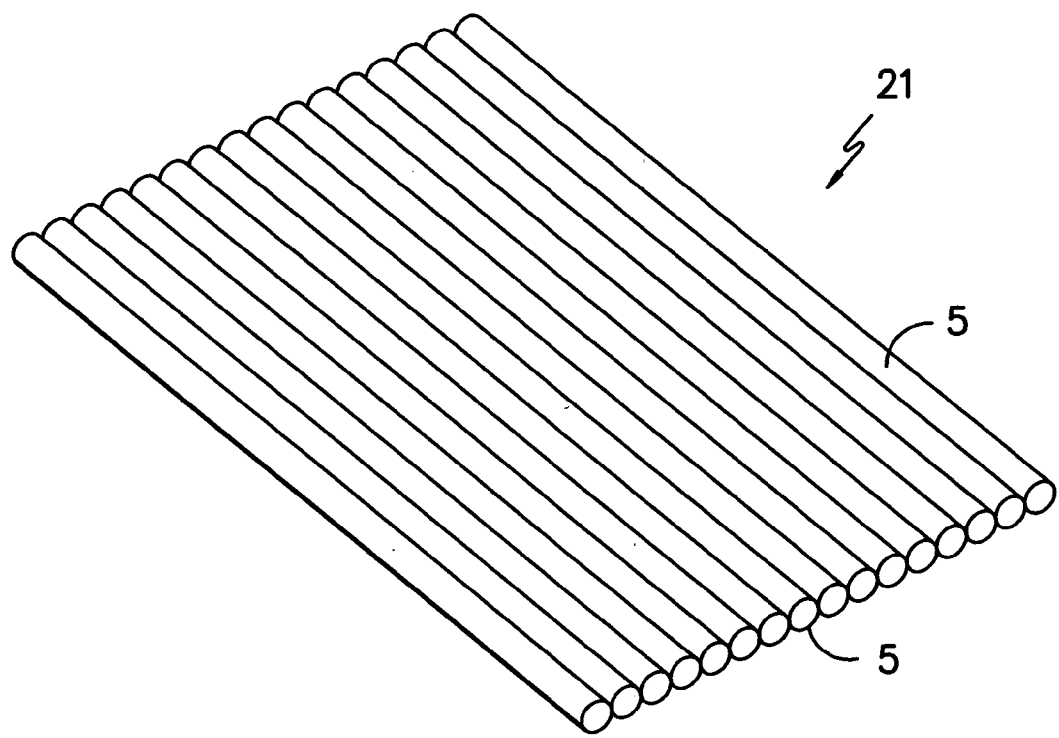
FIG. -2B-

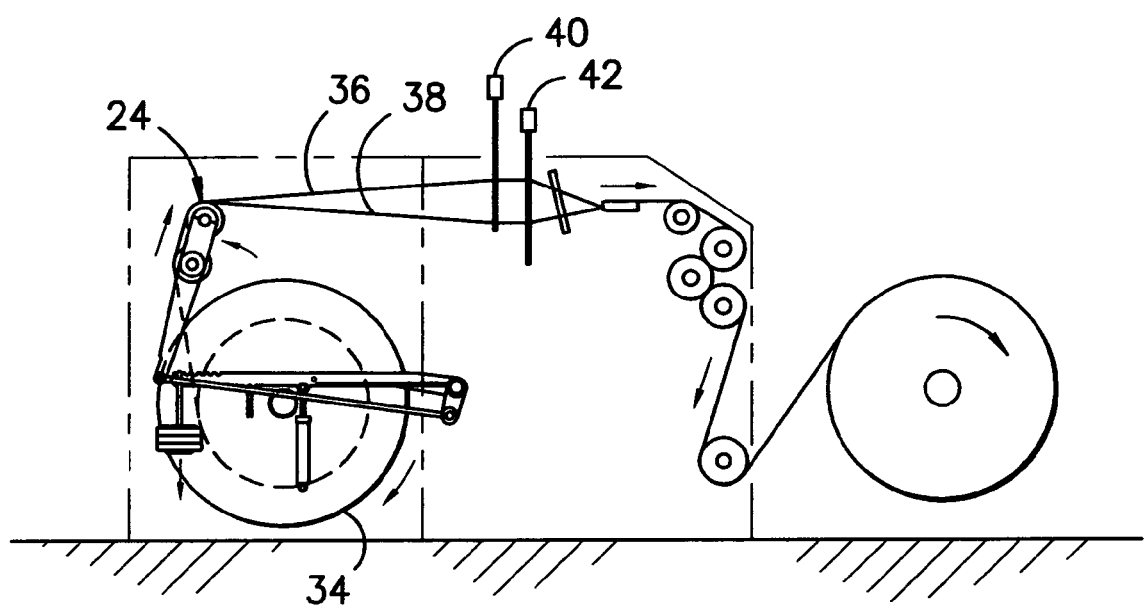
FIG. −3−

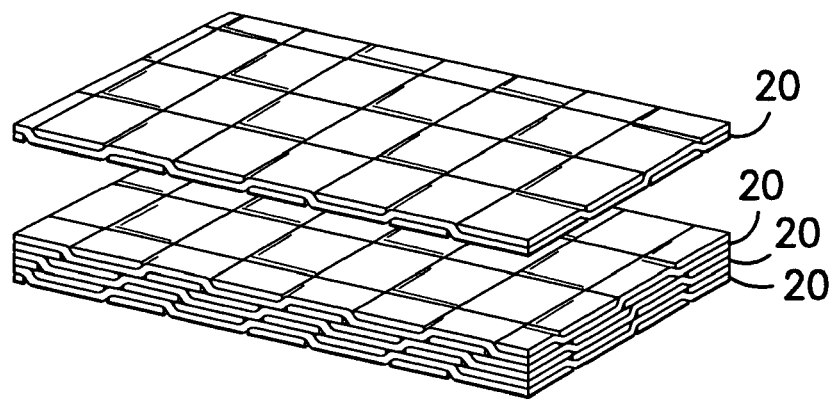
FIG. —4A—
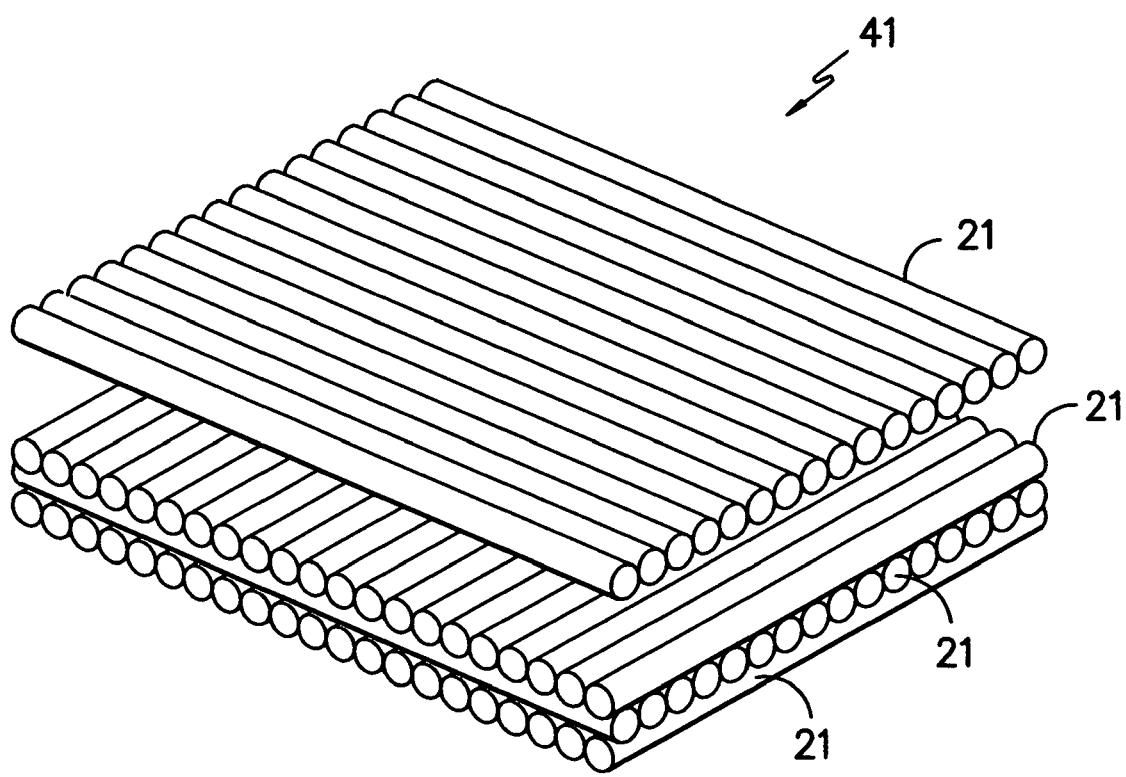
FIG. —4B—

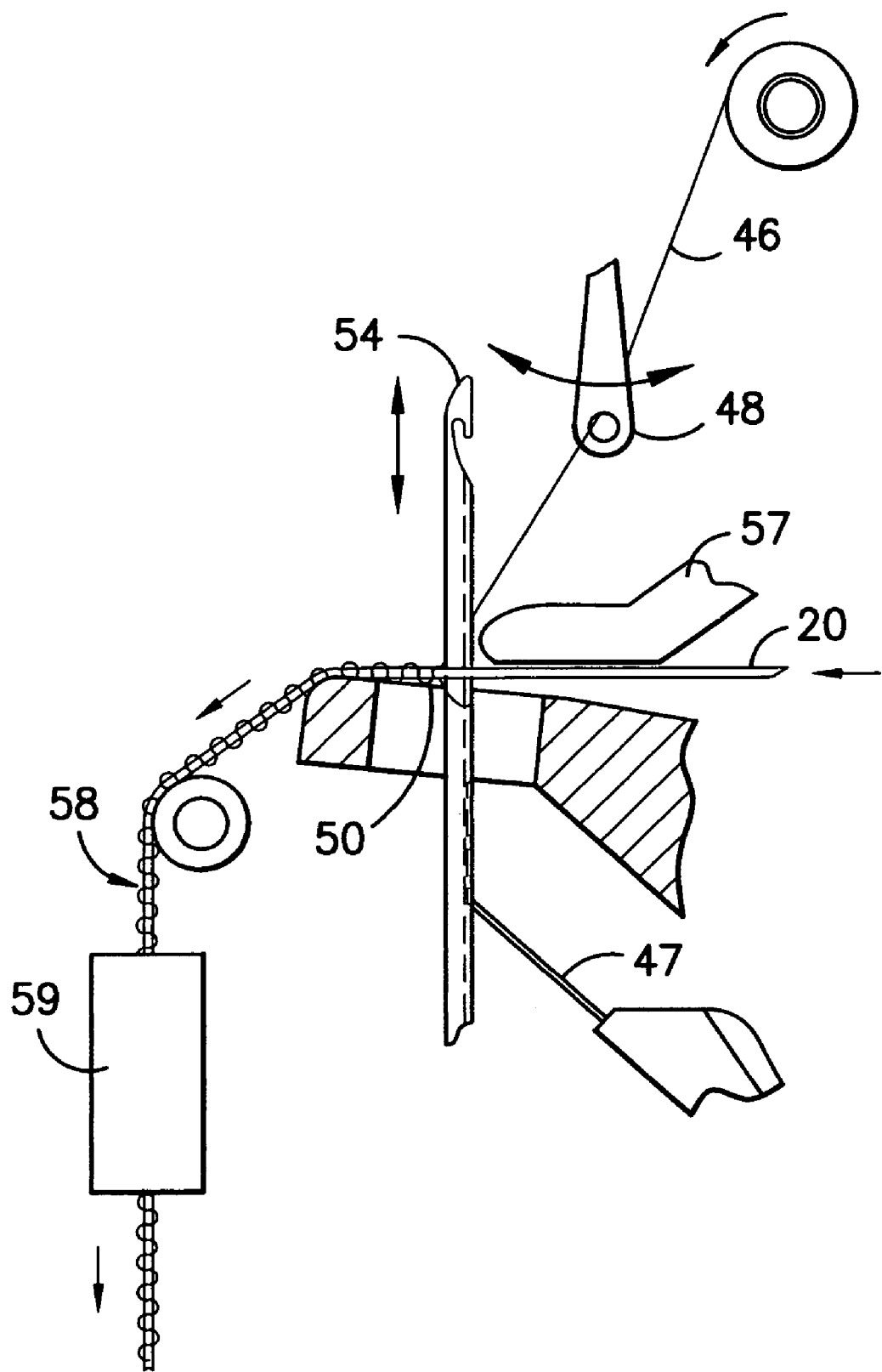
FIG. —5—

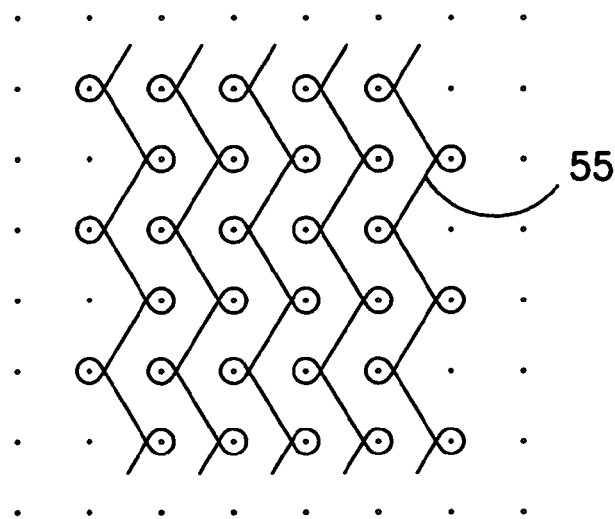
FIG. -6-
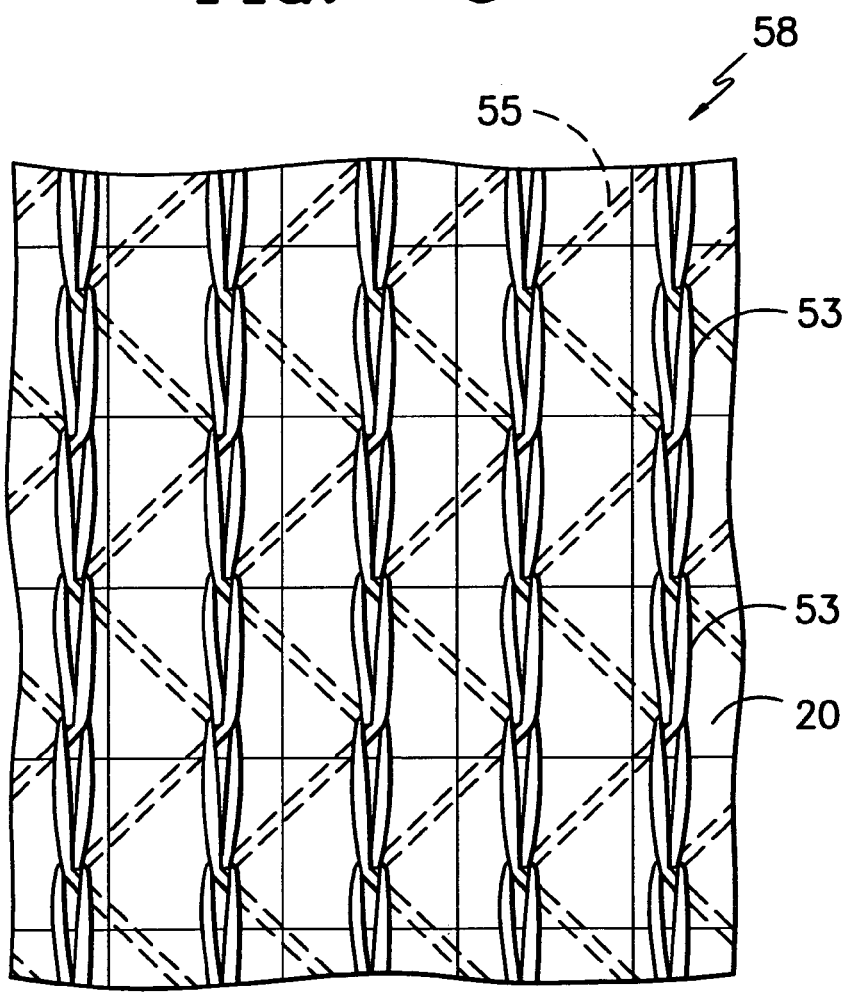
FIG. -7A-

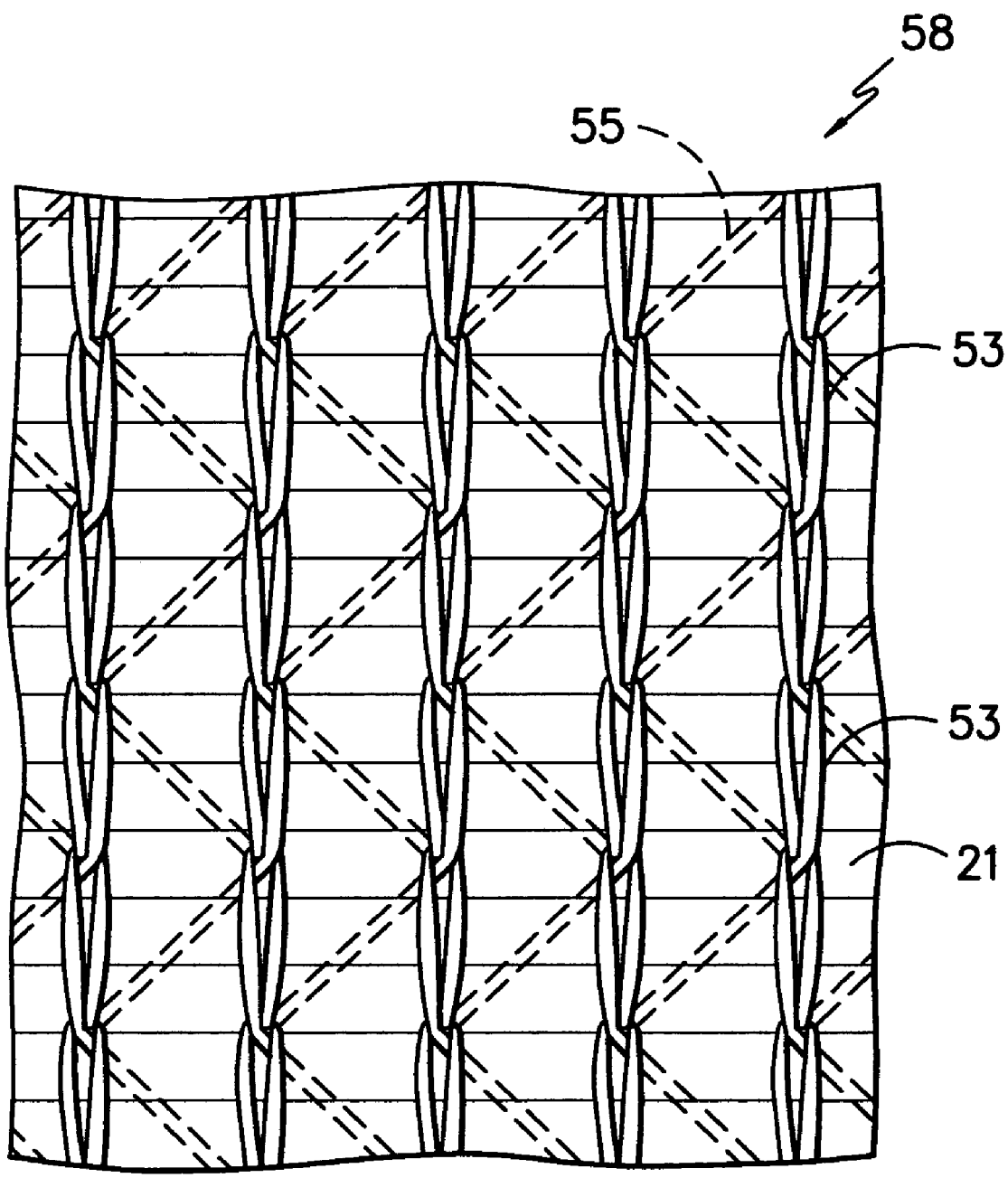
FIG. -7B-

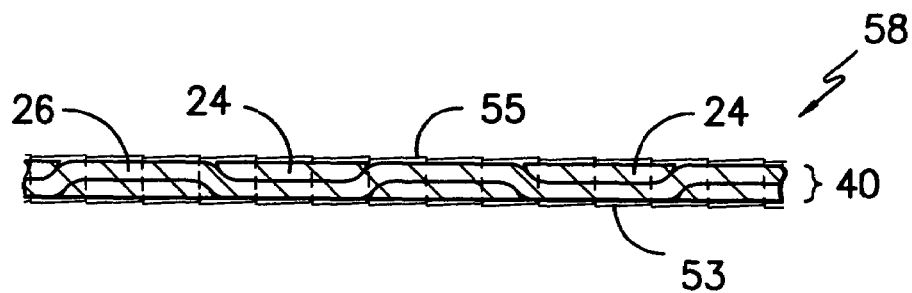
FIG. -8A-
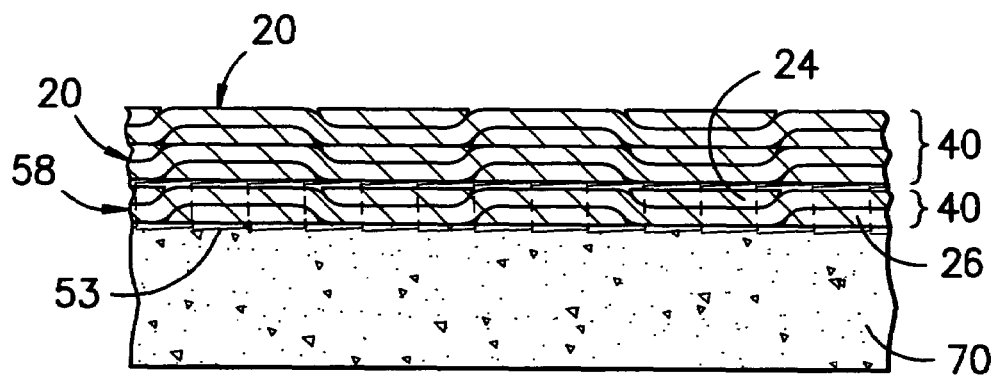
FIG. -8B-
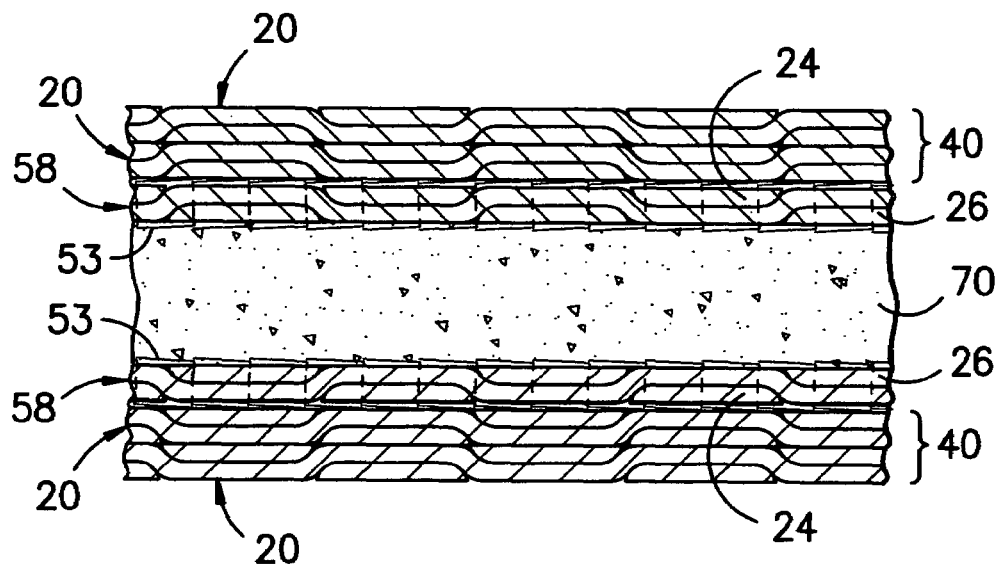
FIG. -8C-

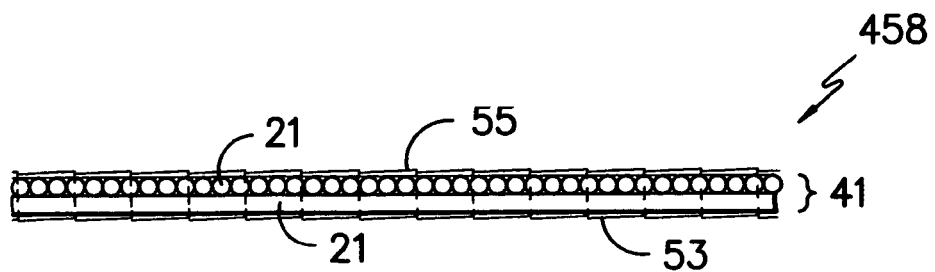
FIG. -9A-
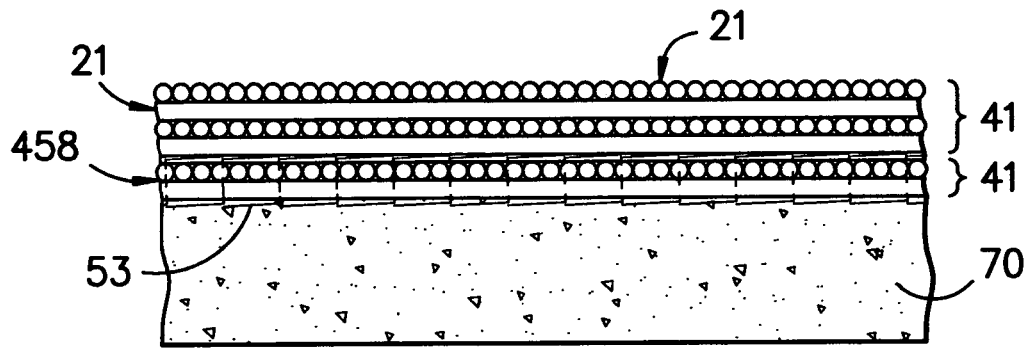
FIG. -9B-
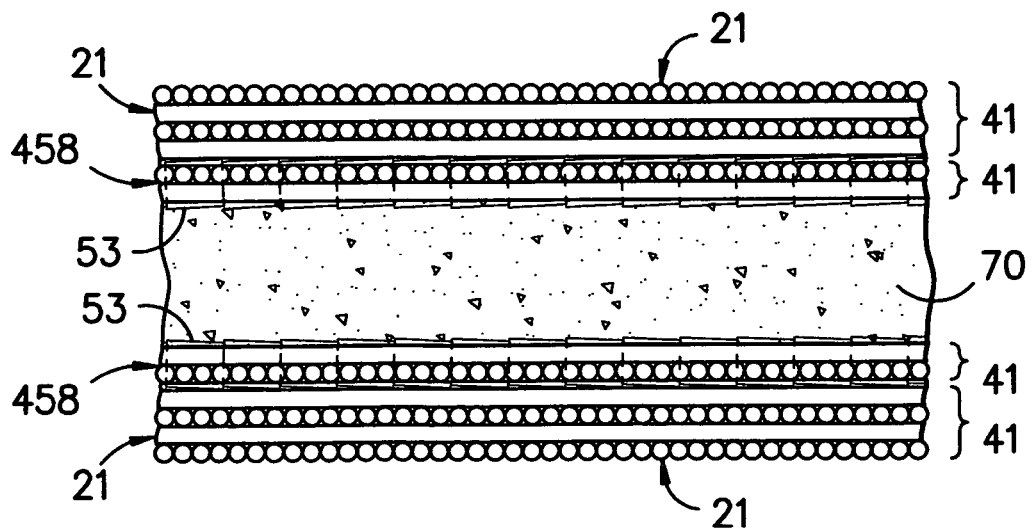
FIG. -9C-

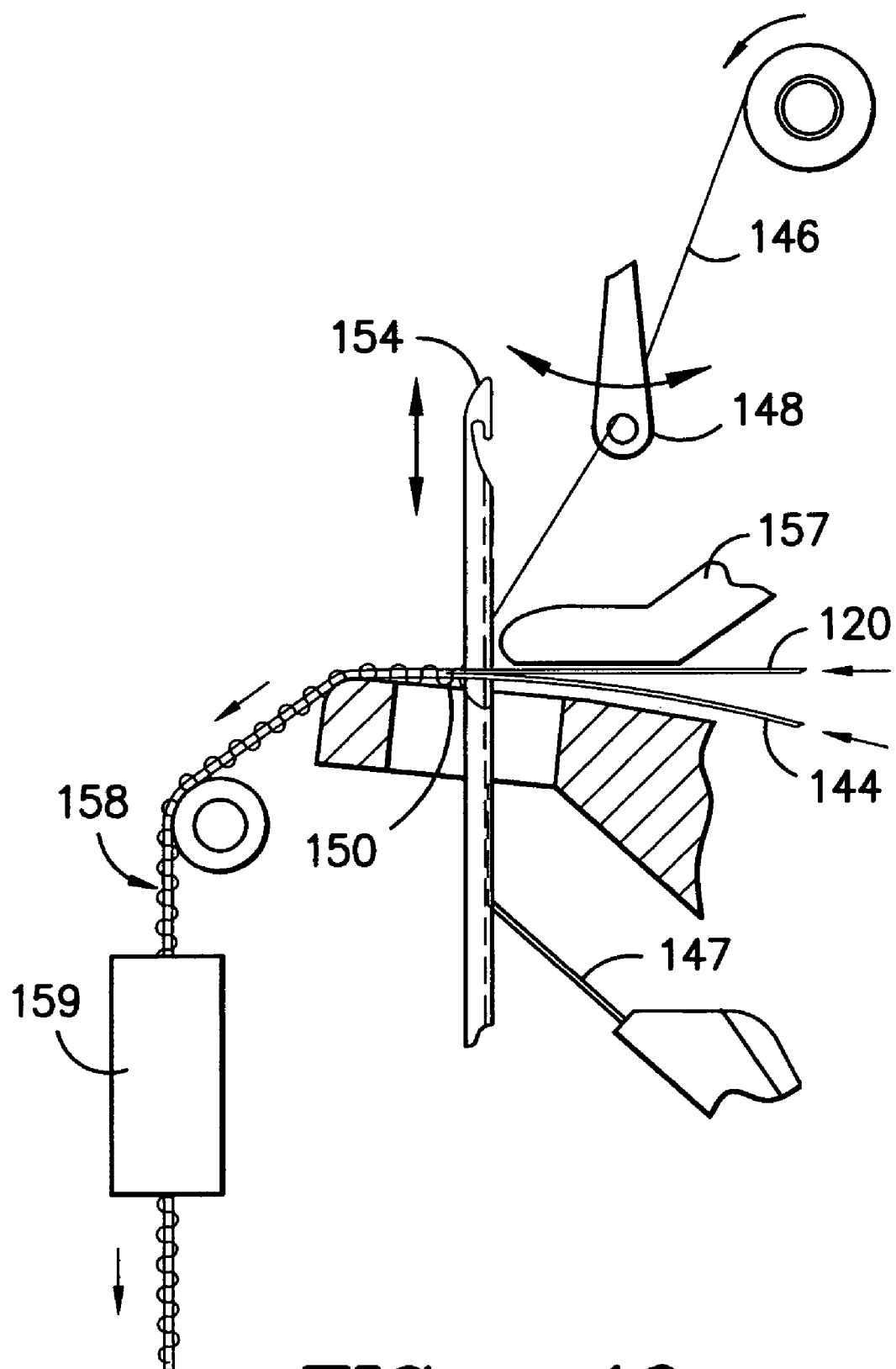
FIG. -10-

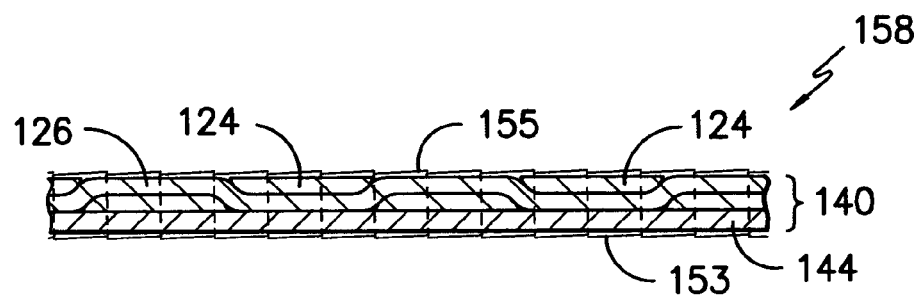
FIG. —11A—
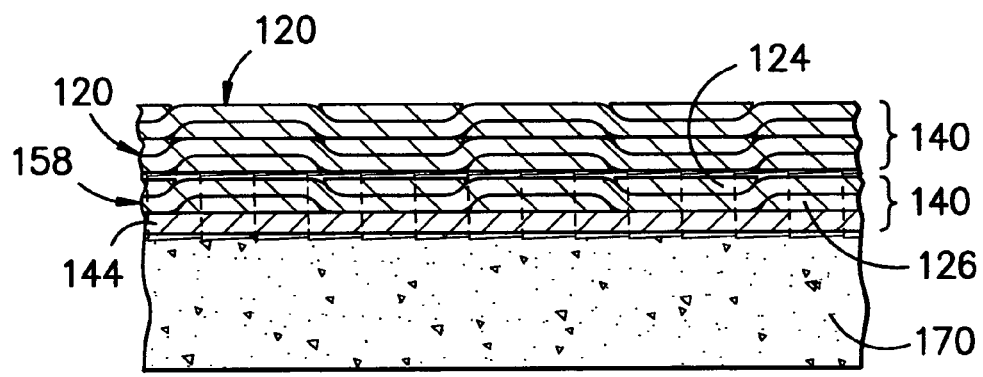
FIG. —11B—
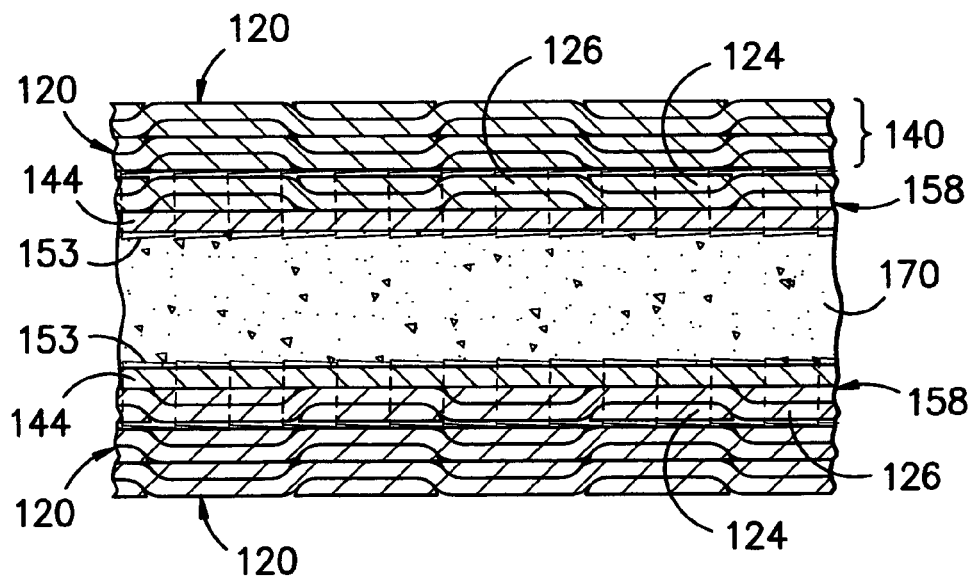
FIG. —11C—

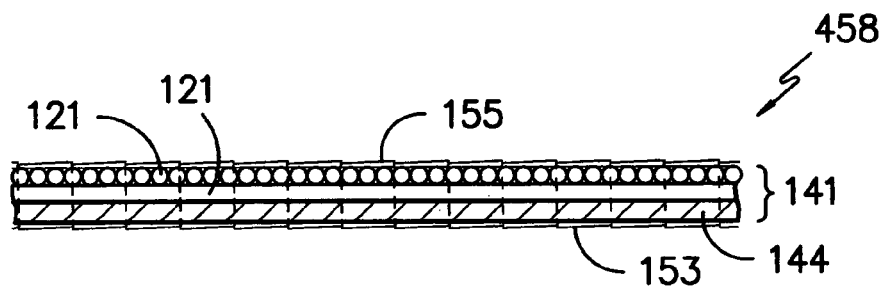
FIG. -12A-
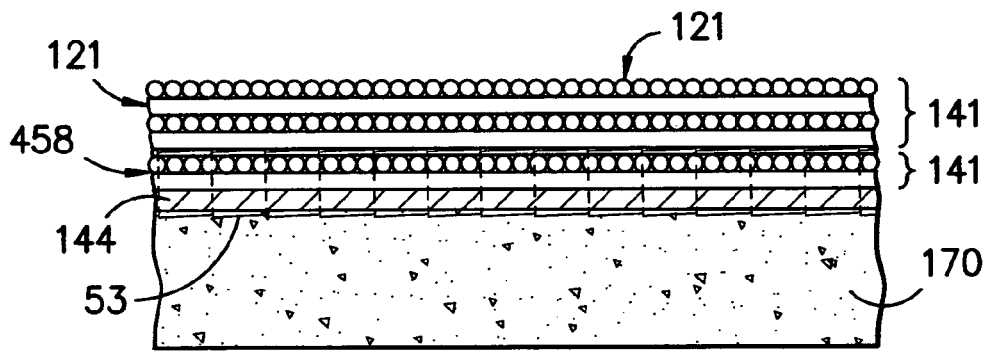
FIG. -12B-
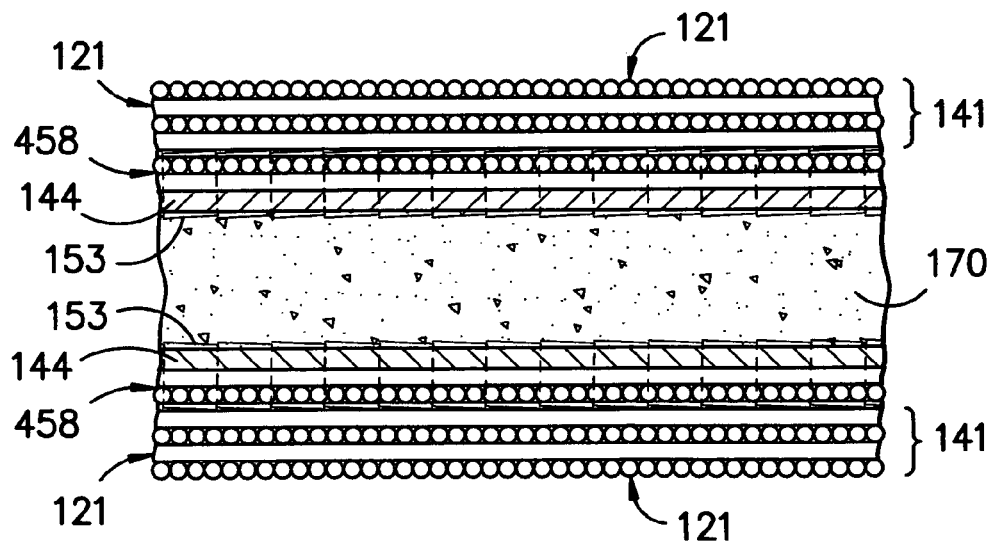
FIG. -12C-

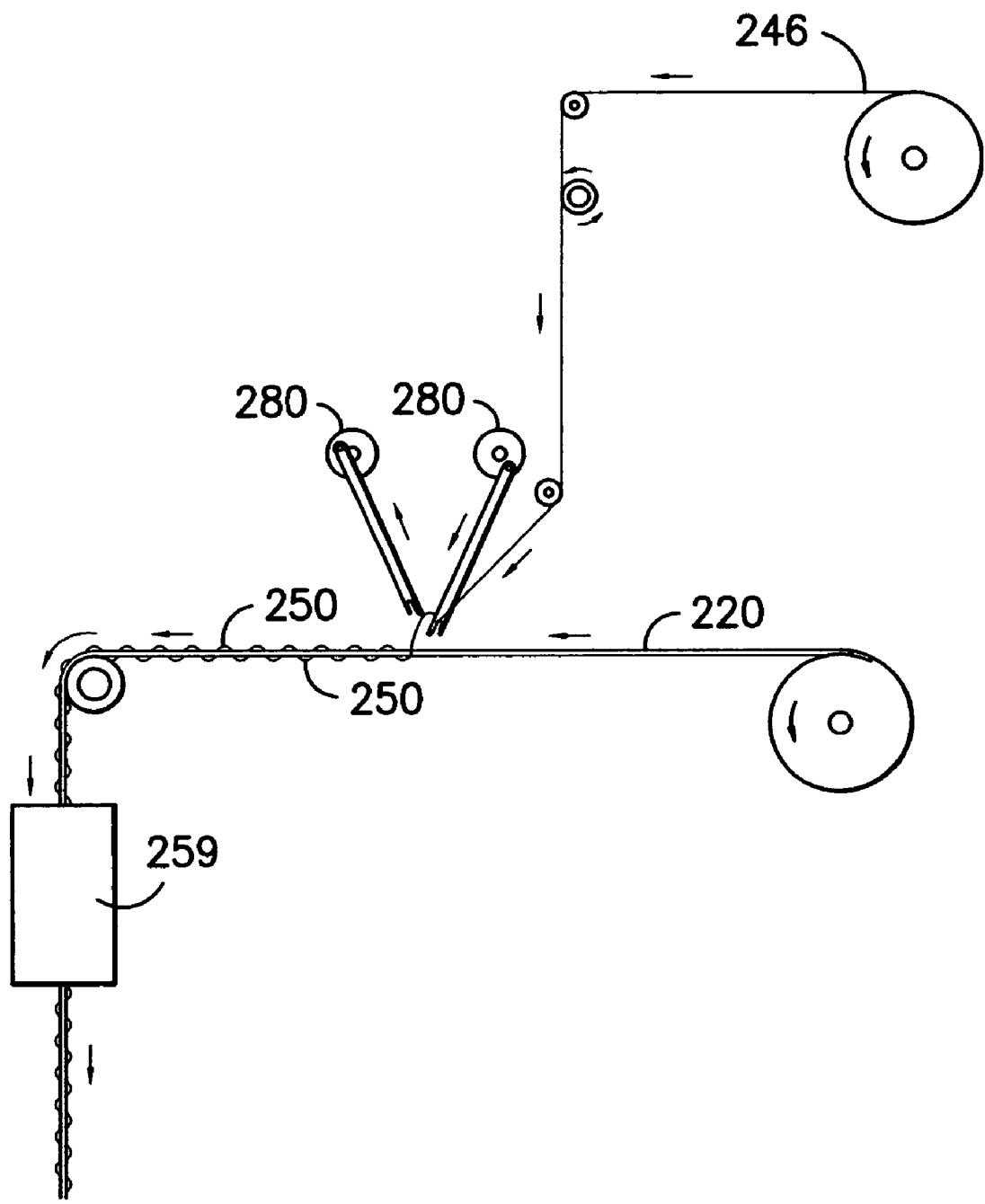
FIG. -13-

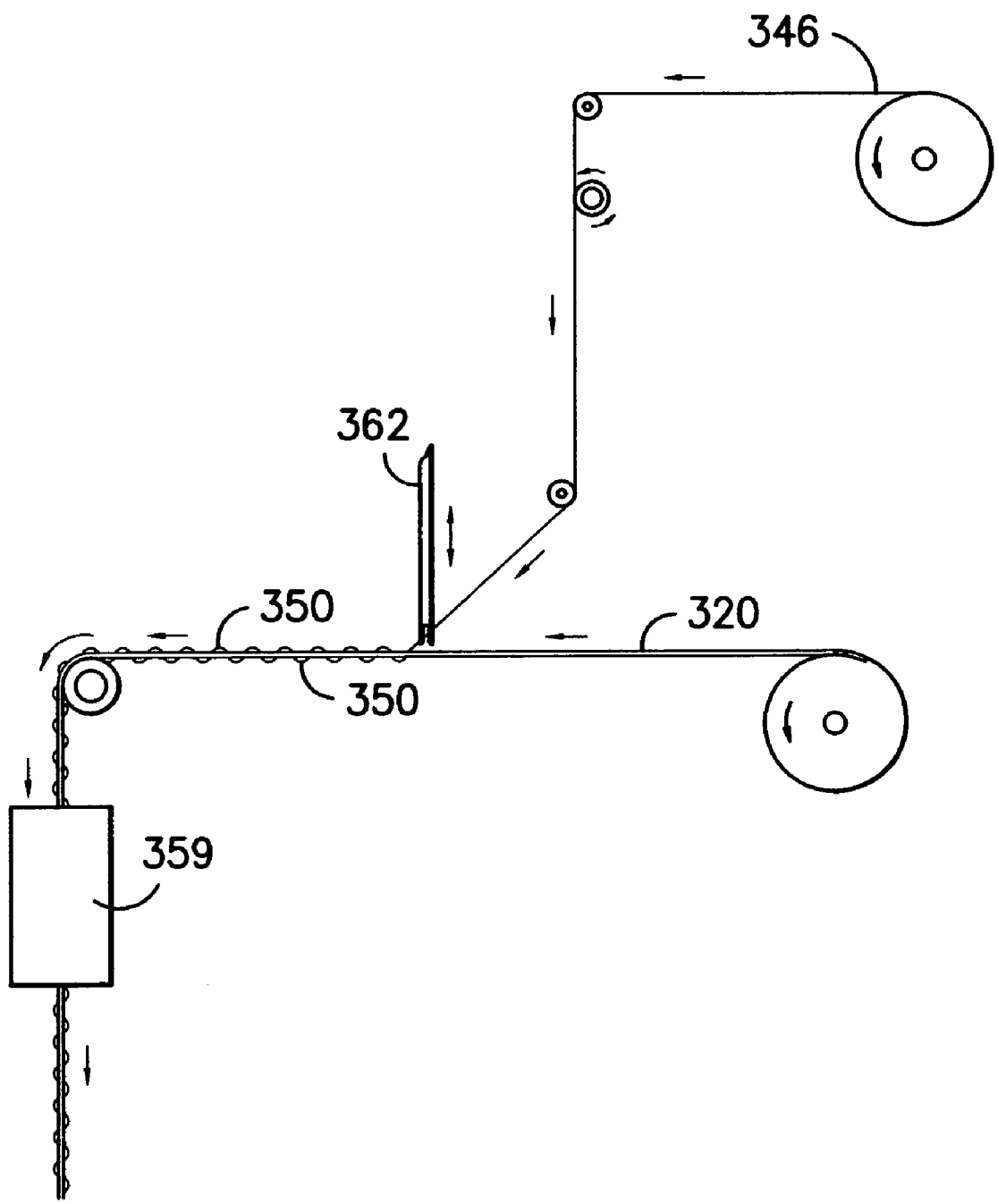
FIG. —14—

MOLDABLE CONSTRUCTION INCORPORATING BONDING INTERFACE

CROSS-REFERENCE

This application, is a continuation-in-part application of pending U.S. patent application Ser. No. 11/235/941, filed on Sep. 27, 2005.

TECHNICAL FIELD

This invention relates to a thermoplastic composite composition. More particularly, the invention relates to a composite incorporating a mat structure formed from one or more unidirectional, nonwoven, knitted, or woven layers of fibers with embedded fiber elements anchored within the mat structure to define a substantially secure bondable surface structure in layered relation relative to at least a portion of the mat structure. The bondable surface structure is adapted to provide secure bonding to an adhesive or non-adhesive substrate layer when at least partially bonded or embedded in contacting relation within such substrate layer. Methods of forming such composite materials are also provided.

BACKGROUND OF THE INVENTION

It has been proposed to form tape structures from polypropylene film that is coated with a layer of propylene copolymer including ethylene units such that the coating has a lower softening point than the core. Such tape structures are disclosed, for example, in U.S. Pat. No. 5,578,370 the teachings of which are hereby incorporated by reference in their entirety. U.S. Patent Application 2004/0242103A1 (incorporated by reference) has also proposed to form mono-axially drawn tape structures characterized by substantial draw ratios and incorporating a central layer of a polyolefin with one or two covering layers of a polyolefin from the same class as the central layer. The DSC melting point of the outer layers is lower than that of the central layer to facilitate heat bonding. Such drawn tape elements may be interwoven so as to form a mat structure which is then subjected to heat thereby fusing the tape elements in place. Multiple layers of such interwoven mat structures may be combined to form moldable structures of substantial thickness that may be shaped to three-dimensional configurations.

While the moldable mat structures of the prior art are highly useful for a number of end uses, it has been found that the surface character of the olefin tape elements and olefin fibers tends to reduce adhesion between the formed mat structure and applied substrate layers incorporating materials such as adhesives, resins, foams, plastics, rubbers and the like. Accordingly, the need exists to provide a system that facilitates lamination while nonetheless maintaining the desirable moldable properties and physical properties of the mat structures.

SUMMARY OF THE INVENTION

The present invention provides advantages and/or alternatives over the prior art by providing a unidirectional composite construction incorporating one or more unidirectional fiber layers formed into a unidirectional mat structure with embedded fiber elements anchored within the mat structure. Each unidirectional fiber layer comprises a plurality of fibers arranged substantially parallel to one another along a common fiber direction. The embedded fiber elements operate alone or in conjunction with one or more surface layers to define a substantially secure bondable surface structure in layered relation relative to at least a portion of the mat structure. The bondable surface structure is adapted to provide secure bonding to an adhesive or non-adhesive substrate layer when at least partially bonded or embedded in contacting relation within such substrate layer.

According to one contemplated aspect, the invention also provides a composite construction incorporating one or more mat layers of interwoven axially drawn tape fiber elements with embedded fiber elements anchored within the mat structure. The embedded fiber elements operate alone or in conjunction with one or more surface layers to define a substantially secure bondable surface structure in layered relation relative to at least a portion of the mat structure. The bondable surface structure is adapted to provide secure bonding to an adhesive or non-adhesive substrate layer when at least partially bonded or embedded in contacting relation within such substrate layer.

BRIEF DESCRIPTION OF THE DRAWINGS

The accompanying drawings which are incorporated in and which constitute a part of this specification illustrate several exemplary constructions and procedures in accordance with the present invention and, together with the general description of the invention given above and the detailed description set forth below, serve to explain the principles of the invention wherein:

FIG. 1A illustrates schematically a cross-section of the multilayer film;

FIG. 1B illustrates schematically a fabric woven from drawn strips of the multilayer film;

FIG. 2A illustrates schematically a fiber with a circular cross-section;

FIG. 2B illustrates schematically a layer formed from unidirectional fibers;

FIG. 3 illustrates schematically a process for forming a fabric woven from drawn strips of the multilayer film;

FIG. 4A illustrates a woven mat structure formed from multiple layers of woven tapes formed from drawn strips of film;

FIG. 4B illustrates a unidirectional mat structure formed from multiple unidirectional fiber layers;

FIG. 5 illustrates schematically a process for forming a stitched interface surface across one side of a woven mat fabric formed from drawn strips of film;

FIG. 6 is a needle point diagram illustrating one contemplated arrangement of stitches for forming a stitched interface surface across a mat structure;

FIG. 7A is a view illustrating the stitching arrangement formed on a woven tape layer according to the needle point diagram of FIG. 6;

FIG. 7B is a view illustrating the stitching arrangement formed on a unidirectional fiber layer according to the needle point diagram of FIG. 6;

FIG. 8A is a cross-sectional view of an exemplary composite construction comprising a stitched interface surface across a woven mat structure formed from drawn strips of film;

FIG. 8B illustrates the woven tape composite of FIG. 8A held in partially bonded or embedded relation within a substrate layer and having a covering structure of a woven mat structure;

FIG. 8C illustrates the exemplary composite construction of FIG. 8A held in partially bonded or embedded relation across opposing sides of a substrate layer;

FIG. 9A is a cross-sectional view of an exemplary composite construction comprising a stitched interface surface across a unidirectional mat structure;

FIG. 9B illustrates the unidirectional composite of FIG. 8B held in partially bonded or embedded relation within a substrate layer and having a covering structure of a unidirectional mat structure;

FIG. 9C illustrates the exemplary composite construction of FIG. 8B held in partially bonded or embedded relation across opposing sides of a substrate layer;

FIG. 10 illustrates schematically a process for forming stitching an interface layer across one side of a woven mat fabric formed from drawn strips of film;

FIG. 11A is a cross-sectional view of an exemplary composite construction with an interface layer stitched across a woven mat structure formed from drawn strips of film;

FIG. 11B illustrates the exemplary composite construction of FIG. 12A held in bonded partially bonded or embedded relation within a substrate layer;

FIG. 11C illustrates the exemplary composite construction of FIG. 12A held in partially bonded or embedded relation across opposing sides of a substrate layer;

FIG. 12A is a cross-sectional view of an exemplary composite construction with an interface layer stitched across a unidirectional mat structure formed from drawn strips of film;

FIG. 12B illustrates the exemplary composite construction of FIG. 12B held in bonded partially bonded or embedded relation within a substrate layer;

FIG. 12C illustrates the exemplary composite construction of FIG. 12B held in bonded partially bonded or embedded relation across opposing sides of a substrate layer; and FIGS. 13 and 14 illustrate alternative practices for securing bondable yarn elements across a woven mat fabric formed from drawn strips of film.

DESCRIPTION OF PREFERRED EMBODIMENTS

As used herein, "fiber" denotes an elongate body, the length dimension of which is much greater than the transverse dimensions of width and thickness. Accordingly, "fiber" includes monofilament, multi-filament, ribbon, tape, strip, staple and other forms of chopped, cut or discontinuous fiber and the like having regular or irregular cross-sections. "Fiber" includes a plurality of any one of the above or a combination of the above.

The cross-sections of the fibers for use in this invention may vary widely. They may be circular, flat or oblong in cross-section. They also may be of irregular or regular multi-lobal cross-section having one or more regular or irregular lobes projecting from the linear or longitudinal axis of the filament. It is particularly preferred that the filaments be of substantially circular, flat or oblong cross-section.

Exemplary embodiments of the present invention will now be described by reference to the accompanying drawings, in which, to the extent possible, like reference numerals are used to designate like components in the various views. Turning now to the drawings, FIG. 1A depicts one embodiment of the invention in which the fiber is a multi-layered tape. An exemplary construction of multilayer polymeric film 10 made up of a core layer 12 disposed between surface layers 14, 14'. Alternatively, it is contemplated that only a single surface layer may be present, thereby resulting in a construction of a core layer 10 being adjacent to surface layer 14. The film 10 may be formed by any conventional means of extruding such multilayer polymeric films. By way of example, and not limitation, the film 10 may be formed by blown film or cast film extrusion. The film 10 is then cut into a multiplicity of longitudinal strips of a desired width (not shown) by slitting the film 10 to form tapes with cross-sections as shown in FIG. 1A. The strips of film 10 are then drawn in order to increase the orientation of the core layer 10 so as to provide increased strength and stiffness of the material.

It is contemplated that the core layer 12 of the film 10 is preferably made up of a molecularly-oriented thermoplastic polymer, the core layer 12 being fusible to each of surface layers 14, 14' at their respective intersections. The core layer 12 is compatibly bonded to each of surface layers 14, 14' between their contiguous surfaces. It is further contemplated that the surface layers 14, 14' have a softening temperature, or melting temperature, lower than that of the core layer 12. By way of example only, it is contemplated that the core layer 12 is a polyolefin polymer such as polypropylene, polyethylene, a polyester such as polyethyleneterephthalate, or a polyamide such as Nylon 6 or Nylon 6-6. According to one potentially preferred practice, the core layer 12 may be polypropylene or polyethylene. The core layer 12 may account for about 50-99 wt. % of the film 10, while the surface layers 14, 14' account for about 1-50 wt. % of the film 10. The core layer 12 and surface layers 14, 14' being made up of the same class of materials to provide an advantage with regard to recycling, as the core layer 12 may include production scrap.

In an embodiment with a core layer 12 of polypropylene, the material of surface layers 14, 14' is preferably a copolymer of propylene and ethylene or an a-olefin. Particularly advantageous results have been achieved by using a random copolymer of propylene-ethylene. It may be preferred to use said copolymer with an ethylene content of about 1-25 mol. %, and a propylene content of about 75-99 mol. %. It may be further preferred to use said copolymer with a ratio of about 95 mol. % propylene to about 5 mol. % ethylene. Instead of said copolymer or in combination therewith, a polyolefin, preferably a polypropylene homopolymer or polypropylene copolymer, prepared with a metallocene catalyst, may be used for the surface layers 14, 14'. It is also contemplated that materials such as poly 4methyl 1pentene (PMP) and polyethylene may be useful as a blend with such copolymers in the surface layers 14, 14'. The surface layer material should be selected such that the softening point of the surface layer 14, 14' is at least about 10° C. lower than that of the core layer 12, and preferably between about 15-40° C. lower. The upper limit of this difference is not thought to be critical, and the difference in softening points is typically less than 70° C.

By way of example only, and not limitation, one film material that may be particularly useful is believed to be marketed under the trade designation PURE by Lankhorst/ Indutech having a place of business in Sneek, The Netherlands.

As mentioned above, the film 10 may be cut into a multiplicity of longitudinal strips of a desired width by slitting the film 10 in a direction transverse to the layered orientation of core layer 12 and surface layers 14, 14'. The strips of film 10 are then drawn in order to increase the orientation of the core layer 10 so as to provide increased strength and stiffness to the material. After the drawing process is complete, the resulting strips are in the range of about 1.5 to about 5 millimeters wide.

FIG. 2A illustrates another fiber geometry that can be used in the invention. FIG. 2A shows a filament fiber 5 with a circular cross-section, but may also be oblong, irregular, regular, multi-lobal, etc. Filament fibers such as shown in FIG. 2A can typically be stretched to greater degrees than the tape or strip fibers described above. The filament fibers 5 are preferably made up of high strength fibers. Useful high strength fibers include polyolefin fibers (including polypropylene and polyethylene), extended chain polyethylene (ECPE) fibers, aramid fibers, polybenzazole fibers such as polybenzoxazole and polybenzothiazole, polyvinyl alcohol fibers, polyester such as polyethyleneterephthalate, polyarmides such as nylon 6, nylon 6,6, and nylon 4,6, polyethylene terephthalate, polyethylene naphthalate, polyacrylonitrile, liquid crystal copolyester, glass and carbon fibers. In one preferred embodiment, the fibers are a polypropylene or polyethylene. The fibers may contain multiple layers including a core layer and sheath layer(s). If multilayered fibers are utilized, preferably the core layer is compatibly bonded to each of sheath layer(s) between their contiguous surfaces. It is further contemplated that the sheath layer(s) have a softening temperature, or melting temperature, lower than that of the core layer.

The fibers are then formed into layers such as a felt or other nonwoven, knitted or woven layers. According to a particularly preferred configuration, the fibers are unidirectionally aligned in a layer so that they are substantially parallel to each other along a common fiber direction.

FIG. 1B illustrates a woven tape layer 20 woven from strips of the film 10. As illustrated, the woven tape layer 20 preferably includes a multiplicity of warp strips 24 of film 10 running in the warp direction of the woven tape layer 20. The warp strips 24 are interwoven with fill strips 26 running in the fill direction in transverse relation to the warp strips 24. As shown, the fill strips 26 are interwoven with the warp strips 24 such that a given fill strip extends in a predefined crossing pattern above and below the warp strips 24. In the illustrated arrangement, the fill strips 26 and the warp strips 24 are formed into a so called plain weave wherein each fill strip 26 passes over a warp strip and thereafter passes under the adjacent warp strip in a repeating manner across the full width of the woven tape layer 20. However, it is also contemplated that any number of other weave constructions as will be well known to those of skill in the art may likewise be utilized. By way of example only, and not limitation, it is contemplated that the fill strips 26 may pass over two or more adjacent warp strips 24 before transferring to a position below one or more adjacent warp strips thereby forming a so-called twill weave. It is likewise contemplated that the mat may utilize other interwoven constructions including knit constructions, weft insertion constructions and the like if desired. Thus, the terms "woven" and "interwoven" are meant to include any construction incorporating interengaging formation strips.

By way of example only, the formation of the woven tape layer 20 incorporating a traditional woven structure as described may be understood through reference to the simplified schematic in FIG. 3. As illustrated, in the formation process the warp strips 24 of film 10 may be unwound from a beam 34 and separated into two or more sheets 36, 38 for processing. For example, the sheet 36 may be made up of the even numbered warp strips while the sheet 38 may be made up of odd numbered warp strips across the width of the beam. As illustrated, the sheets 36, 38 are threaded through an arrangement of harnesses 40, 42 which may be moved relative to one another to alternate the relative position of the sheets 36, 38, thereby adjusting the shed or spacing between the sheets. As will be appreciated by those of skill in the art, at the weaving machine the fill strips 26 are inserted through the shed between the sheets 36, 38 while the sheets 36, 38 are in spaced relation to one another. As previously indicated, multiple fill strips 26 may be inserted through the shed so as to be side by side in the same orientation relative to the sheets 36, 38. Thereafter, the harnesses 40, 42 may be adjusted so as to reverse the relative position of the sheets 36, 38. Such reversal opens a new shed through which single or multiple fill strips 26 may be inserted before the process is repeated. As will be appreciated, the formation process as described substantially emulates standard weaving processes as are well known to those of skill in the art.

FIG. 2B shows another embodiment where fibers 5 are laid unidirectionally to form a unidirectional layer 21. In one embodiment the fibers 5 in the unidirectional layer 21 do not overlap one another, and may have gaps between the fibers 5. In another embodiment, the fibers 5 may overlap one another up to 90% in the unidirectional sheet 21. Each unidirectional fiber layer comprises a plurality of fibers arranged substantially parallel to one another along a common fiber direction. To form the unidirectional fiber layer 21, yarn bundles of high strength filaments, preferably having about 30 to about 2000 individual filaments of less than about 12 denier, and more preferably of about 100 individual filaments of less than about 7 denier/filament, are supplied from a creel and led through guides and one or more spreader bars into a collimating comb prior to optionally coating or impregnating with a matrix material. The collimating comb aligns the filaments coplanarly and in a substantially unidirectional fashion. The fiber network layers typically contain from about 6 to 12 yarn ends per inch (2.4 to 4.7 ends per cm) and preferably 8 to 11 ends per inch (3.2 to 4.3 ends per cm). Each fiber network layer (including matrix optional material) is typically from about 0.01 to 0.2, preferably about 0.04 to 0.12, and most preferably about 0.06 to 0.10 mm thick. Matrix material may be applied to the individual fibers or to the unidirectional fiber layer to bind the fibers together. Preferably, the optional matrix material is an olefin polymer. The unidirectional fiber layer is then consolidated typically using a combination of heat and pressure.

As illustrated in FIG. 4A, according to one contemplated practice, several woven tape layers 20 may be arranged in layered relation prior to the application of heat and pressure in order to form a woven mat structure 40. The woven tape layers 20 may be formed from a single layer of woven fabric that is repeatedly folded over itself, or from several discrete overlaid sheets. Alternatively, the woven mat structure 40 may be formed by reheating several previously fused groups of woven tape layers 20. When such previously fused material is subjected to a temperature above the softening point of the surface layers 14, 14' and below that of the core layer 12, the matrix will again melt while the core layers remain substantially solid. Upon cooling, the surface layers 14, 14' will again fuse and re-form the matrix. Any of these methods may be employed to form a mat structure 40 with any desired thickness or number of layers. Preferably, the mat structure comprises at least 10 layers.

Consolidation of multiple layers 20 is preferably carried out at suitable temperature and pressure conditions to facilitate both interface bonding fusion and partial migration of the melted surface layer material between the layers. Heated batch or platen presses may be used for multi-layer consolidation. However, it is contemplated that any other suitable press may likewise be used to provide appropriate combinations of temperature and pressure. According to a potentially preferred practice, heating is carried out at a temperature of about 130-160° C. and a pressure of about 0.5-70 bar. When exposed to such an elevated temperature and pressure, the surface layers 14, 14' will melt while the core layer 12 will remain substantially solid. Upon cooling, the surface layers 14, 14' will fuse thereby forming a matrix through which the stiff core layers 12 are distributed. According to a potentially preferred practice, cooling is carried out under pressure to a temperature less than about 115° C. It is contemplated that maintaining pressure during the cooling step tends to inhibit shrinkage. Without wishing to be limited to a specific theory, it is believed that higher pressures may facilitate polymer flow at lower temperatures. Thus, at the higher end of the pressure range, (greater than about 30 bar) the processing temperature may be about 90-135° C. Moreover, the need for cooling under pressure may be reduced or eliminated when such pressures are utilized to facilitate flow.

Due at least in part to the biaxial orientation of the interwoven, highly oriented core layers 12, which are securely held within a matrix of the fused surface layers 14, 14', a composite structure formed from the woven mat fabric 20 as described will exhibit excellent mechanical strength characteristics in both the planar and normal directions at a low weight. Moreover, such constructions are highly adaptable to forced three-dimensional molding procedures at temperatures above the softening point of the surface layers.

In order to securely fuse the warp strips 24 to the fill strips 26 while maintaining the spatial relation between the fibers, it is contemplated that the warp strips 24 and the fill strips 26 will preferably be heated, under pressure, to a temperature above the softening point of surface layers 14, 14' and below that of the core layer 12. In so doing, the surface layers 14, 14' will melt while the core layer 12 will remain substantially solid and highly oriented. As the fabric 20 then cools, the surface layers 14, 14' will fuse together, thereby forming a solid matrix through which is woven the highly oriented, stiff structure of the core layer 12. This fusion may take place either before or after embedded fiber elements are embedded across the thickness dimension of the fabric 20 as will be described further hereinafter.

FIG. 4B shows a unidirectional mat structure 41 of the invention comprising at least 3 layers, each layer having a plurality of fibers arranged substantially parallel to one another along a common fiber direction. Successive layers of such unidirectionally aligned fibers can be rotated with respect to the previous layer. Preferably, the fiber layers 21 of the mat structure 41 are crossplied, that is, with the fiber direction of the unidirectional fibers of layer 21 rotated with respect to the fiber direction of the adjacent unidirectional fiber layers 21. An example is a five layer article with the second, third, fourth and fifth layers rotated +45°, −45°, 90° and 0° with respect to the first layer, though the layers may not be rotated with respect to one another or rotated to any degree. In the most preferred embodiment, the unidirectional fiber layers 21 are cross-plied in the 0°/90° configuration and then molded to form a sub-assembly precursor. The fiber layers 21 can be continuously cross-plied, preferably by cutting one of the networks into lengths that can be placed successively across the width of the other network in a 0°/90° orientation. U.S. Pat. Nos. 5,173,138 and 5,766,725 describe apparatus for continuous cross-plying. The stacks of layers are then subjected to heat and pressure in order to fuse the layers and form the finished shape and cure the optional matrix material. Preferably, the mat structure comprises at least 10 layers.

By way of example only, one contemplated practice for the introduction of fiber stitching elements across the layers 20 or 21 is illustrated in FIG. 5. As shown, in this practice a stitching or stitch bonding process as may be used to apply a stitching yarn or thread 46 through the woven tape layer 20 (though not shown, the unidirectional fiber layer 21 may be used in place of the woven tape layer 20). The stitching yarn or thread 46 preferably is a non-olefin polymer. As will be appreciated, while FIG. 5 illustrates a single layer, it is likewise contemplated that multiple interface layers and/or woven or unidirectional layers (such as the woven mat structure 40 or the unidirectional mat structure 41) may be utilized if desired. The process may be carried out by stitch boding machines such as MALIMO stitch bonding machines and the like as will be known to those of skill in the art. As shown, the resultant product has an arrangement of yarn elements disposed across a surface of the woven tape layer 20.

In the illustrated practice, the woven tape layer 20 is conveyed to a stitch-forming position. At the stitch-forming position a plurality of stitching yarns 46 are stitched through the woven tape layer 20. As illustrated, yarn guides 48 carry the stitching yarns 46 such that adjacent reciprocating needles 54 alternately engage the stitching yarns 46. As will be appreciated, while only a single needle 54 is illustrated for purposes of simplicity, multiple needles are arranged in side by side relation in the cross-machine direction. Likewise, multiple yarn guides 48 are arranged in the cross-machine direction to carry multiple stitching yarns. As yarns are passed back and forth between adjacent needles, rows of stitches 53 shown in FIGS. 7A and 7B are formed across the underside or so called "technical face" of the formed composite with a zig zag arrangement of crossing yarns 55 across the top or so called "technical back" of the formed composite. As shown, sinker fingers 57 are preferably arranged so as to compress the layers together without engaging the stitching yarns 46.

In the exemplary practice, the needle 54 (which is shown in greatly exaggerated dimension) pierces the substrate 21 and engages the stitching yarn 46 such that the stitching yarn 46 is captured within a hook portion of the needle 54. As the needle 54 is reciprocated downwardly, a closing element 47 such as a closing wire, which moves relative to the needle 54, closes the hook portion to hold the stitching yarn therein. With the hook portion closed, the stitching yarn 46 is pulled through an immediately preceding stitch 53 disposed around the shank of the needle 54. As the stitching yarn 46 is pulled through the interior of the preceding stitch 53, the preceding stitch 53 is knocked off of the needle 54 and a new stitch is established by the portion of the stitching yarn held within the hook portion of the needle. As the needle 54 is raised back through the woven tape layer 20 to the position illustrated in FIG. 5, the hook portion is reopened and the new stitch moves out of the hook portion and is held around the shank of the needle for acceptance of a subsequent stitch during the next downstroke.

A needle point diagram illustrating a typical fully threaded stitch pattern is illustrated in FIG. 6. As will be appreciated by those of skill in the art, this construction utilizes a traditional chain stitch arrangement such that every time the yarn travels around a needle there is a yarn at the preceding needle location. That is, every time a segment of the stitching yarn 46 is pulled through the substrate, that segment engages a loop formed during the preceding stroke. This arrangement gives rise to a pattern of engaging stitches 53 (FIGS. 7A and 7B) extending in substantially parallel rows in the machine direction across the surface below woven tape layer 20 in FIG. 7A and the unidirectional fiber layer in FIG. 7B of the structure. The crossing segments 55 of the stitch yarns running between the stitch rows across the technical back are shown as hidden lines. As will be appreciated, the engaging stitches 53 cooperate with one another in the machine direction of the fabric in a substantially stable interlocking relation thereby anchoring the yarns in place and securing the layers together to form stable composites 58 and 458.

As previously indicated, according to a potentially preferred practice, a multiplicity of fiber stitching elements (such as stitching yarns 46) is disposed at least partially across the thickness dimension of the woven tape mat structures 40 or unidirectional mat structure 41 such that at least a portion of the fiber stitching elements project outwardly from the mat structures 40 or 41. The projecting portions thus define at least a partial surface covering across the mat structure 40 or 41. Preferably, the fiber stitching elements are non-olefin fibers. The fiber stitching elements are preferably anchored in place relative to the woven tape layer 20 or unidirectional fiber layer 21 by the formation of stitches and/or through fusion bonding within the matrix of the layers 20 or 21. As will be appreciated, such fusion bonding may be achieved by subjecting the layers 20 or 21 or mat structures 40 or 41 with the applied fiber stitching elements to an elevated temperature environment sufficient to activate or reactivate the material forming the surface layers 14, 14' (the case of the tape fiber elements) or the fibers or matrix (in the case of the unidirectional fiber layers) thereby causing such material to at least partially encapsulate the fiber stitching elements and lock them in place.

As best seen in the cross-sectional view of FIG. 8A, the woven tape composite 58 comprising a woven mat structure 40 incorporating at least one woven tape layer 20 with segments of stitching yarn 46 disposed across at least a portion of the surface. Depending upon the density of stitches utilized and the construction of the stitching yarn, the stitching yarn 46 may substantially cover the woven tape layer 20 or may be present in a relatively sparse arrangement. As shown, after the stitching yarns the woven tape composite 58 may be passed through a heater 59 to fuse the stitching yarns in place.

As best seen in the cross-sectional view of FIG. 9A, the unidirectional composite 458 incorporating a unidirectional mat structure 41 comprising at least one unidirectional fiber layer 21 with segments of stitching yarn 46 disposed across at least a portion of the surface. Depending upon the density of stitches utilized and the construction of the stitching yarn, the stitching yarn 46 may substantially cover the unidirectional fiber layer 21 or may be present in a relatively sparse arrangement. As shown, after the stitching yarns the unidirectional composite 458 may be passed through a heater 59 to fuse the stitching yarns in place.

In the illustrated and described arrangement, the outwardly projecting portions of the stitching yarns define a contact surface adapted for mechanical and/or chemical adhesion to substrates that typically do not adhere to the mat structures 40 and 41. By adjustment of the stitch density and character, it has been found that the adhesion characteristics may likewise be adjusted. The stitching yarns 46 are preferably polyester, although other non-olefin yarn materials such as nylon, cotton, aramid and the like may also be used.

As illustrated in FIGS. 8B and 9B, the woven tape composite 58 (woven mat structure with inserted stitching yarns) and the unidirectional composite 458 (layers of unidirectional fiber layers with inserted stitching yarns) may be applied in laminate relation across a surface of a substrate layer 70 such as adhesive, resin, foam, plastic, rubber, or the like with the projecting portions of the stitching yarns 46 providing secure attachment. That is, the stitching yarns bond to the substrate layer 70 while also being locked into the woven mat structure 40 or the unidirectional mat structure 41 thereby avoiding undesired delamination. By way of example only, and not limitation, exemplary substrate layers 70 that are bondable to such a formed composite may include polyurethane, acrylic, methacrylic, epoxy, hot melt, cyanoacrylate, phenolics, unsaturated polyester resins, melamine and combinations thereof. Such materials typically exhibit poor adhesion relative to structures such as the woven mat structure 40 and the unidirectional mat structure 41 which may be olefin polymers. While the substrate layer 70 is shown as a single layer, it is likewise contemplated that multiple layers of the same or different material may be used. By way of example only, the substrate 70 may include an adhesive disposed in contacting relation with the woven tape composite 58 or the unidirectional composite 458 with one or more underlying layers such as foam, rubber or other material.

As illustrated in FIG. 8B, the woven mat structure 40 comprising one or more additional woven tape layers 20 may be placed in covering relation across the face of the woven tape composite 58 facing away from the substrate 70. Such additional layers thus provide a surface covering over the stitching yarn 46 thereby defining an outer face that is free of projecting yarn segments. Of course, such additional layers are optional and the woven tape composite 58 may define the outer face if desired.

As illustrated in FIG. 9B, the unidirectional mat structure 41 comprising one or more additional unidirectional fiber layers 21 may be placed in covering relation across the face of the unidirectional composite 458 facing away from the substrate 70. Such additional layers thus provide a surface covering over the stitching yarn 46 thereby defining an outer face that is free of projecting yarn segments. Of course, such additional layers are optional and the unidirectional composite 458 may define the outer face if desired.

If desired, the woven tape composite 58 or the unidirectional composite 458 and any covering layers may be molded before, after or during application to the substrate 70. According to one contemplated practice, it is contemplated that the composites 58 or 458 may be applied across the surface of a heat curable substrate 70 such as a curable foam with heat and pressure then being applied to mold and fuse the composite 58 while simultaneously curing the substrate 70. Thus, a three-dimensional structure may be formed having matched curvature between the surface and substrate layers with little retained stress. Of course, the composites 58 and 458 and substrate 70 may also be substantially flat as illustrated in FIGS. 9A and 9B.

FIG. 8C shows the woven tape composite 58 applied across opposing surfaces of a substrate 70 either with or without additional surface-defining covering layers. FIG. 9C shows the unidirectional composite 458 applied across opposing surfaces of a substrate 70 either with or without additional surface-defining covering layers. In such construction as shown in FIGS. 8C and 9C, the composites 58 and 458 on either side may be either similar or dissimilar depending on the desired environment of use. As with the single side covering, the final structure may be either molded or flat. While the substrate material 70 is shown as a single layer, it is likewise contemplated that multiple layers of the same or different material may be used. By way of example only, the substrate material 70 may include an adhesive disposed in contacting relation with the composites 58 and 458 with one or more underlying layers such as foam, rubber or other material. Of course, the use of additional surface-defining covering layers may be limited to a single side if desired.

FIG. 10 illustrates another contemplated construction practice wherein elements corresponding to those previously described are designated by like reference numerals within a 100 series. In the illustrated construction, a fibrous textile interface layer 144 is secured across at least one side of the woven tape layer 120 or woven mat structure 140 formed therefrom. Though not shown, the unidirectional fiber layer 121 may be used in place of the woven tape layer 120). The stitching yarn or thread 46 preferably is a non-olefin polymer. As will be appreciated, while FIG. 10 illustrates a single layer, it is likewise contemplated that multiple interface layers and/or woven or unidirectional layers or mat structures (such as the woven mat structure 40 or the unidirectional mat structure 41) may be utilized if desired. While not shown the fibrous textile interface layer 144 may be secured across at least one side of a unidirectional fiber layer 21 or unidirectional mat structure 141 formed therefrom. The interface layer 144 is preferably secured in place by mechanical fibrous attachment techniques such as the stitch bonding practices previously described wherein fibrous stitching yarns 146 extend in connecting relation between the adjoined layers.

By way of example only, and not limitation, FIG. 10 illustrates a stitching or stitch bonding process as may be used to join a fibrous textile interface layer 144 such as a woven, knit or non-woven fabric to the underside of a woven mat fabric 120 as previously described. As will be appreciated, while FIG. 10 illustrates a single layer of woven mat fabric 120 in combination with a single interface layer 144, it is likewise contemplated that multiple interface layers and/or woven tape layers 120 (or unidirectional fiber layers 121, mat structures 140 or 141) may be utilized if desired. The process may be carried out by stitch bonding machines such as MALIMO stitch bonding machines and the like as will be known to those of skill in the art.

In the illustrated practice in FIG. 10, one or more layers of woven mat fabric 120 formed from multi-layer tape elements as previously described are conveyed to a stitch-forming position. At the stitch-forming position a plurality of stitching yarns 146 are stitched through the interface layer 144 and mat fabric 120. As illustrated, yarn guides 148 carry the stitching yarns 146 such that adjacent reciprocating needles 54 alternately engage the stitching yarns 146. As will be appreciated, while only a single needle 154 is illustrated for purposes of simplicity, multiple needles are arranged in side by side relation in the cross-machine direction. Likewise, multiple yarn guides 148 are arranged in the cross-machine direction to carry multiple stitching yarns. As yarns are passed back and forth between adjacent needles, rows of stitches are formed across the underside or so called "technical face" of the formed composite with a zig zag arrangement of crossing yarns across the top or so called "technical back" of the formed composite. As shown, sinker fingers 157 are preferably arranged so as to compress the layers together without engaging the stitching yarns 146.

As will be appreciated the stitching practice is substantially identical to that described in relation to FIGS. 5-7. However, in the instant practice, the stitching yarns 146 provide the additional function of holding the interface layer 144 in place. Thus, in the resultant product a multiplicity of embedded fiber elements in the form of stitching yarns 146 is disposed at least partially across the thickness dimension of the woven or unidirectional mat structure such that at least a portion of the embedded fiber elements secure the interface layer 144 in place relative to the woven mat structure 140 or unidirectional mat structure 141 with portions of the embedded fiber elements projecting outwardly from the interface layer the mat structure 140 or 141. The projecting portions in combination with the interface layer 144 thus define at least a partial surface covering across the mat structure 140 or 141. The stitching yarns 146 are preferably anchored in place relative to the mat structure 140 or 141 and interface layer 144 by the formation of stitches and/or through fusion bonding within the matrix of the mat structure 140 or 141. As will be appreciated, such fusion bonding may be achieved by subjecting the mat structure 140 or 141 with the applied stitching yarns 146 to an elevated temperature environment sufficient to activate or reactivate the material forming the surface layers 14, 14' (of the woven mat structure 140) or the matrix of fibers of the unidirectional mat structure 141 thereby causing such material to at least partially encapsulate the embedded fiber elements and lock them in place.

As previously indicated, the interface layer 144 is preferably a fibrous textile construction such as a woven, non-woven or knit fabric adapted for bonding attachment to an underlying substrate material. In this regard, the interface layer 144 in combination with projecting portions of the stitching yarns provides a suitable bonding surface for substrate materials including adhesives, resins, foams rubbers and the like as previously described that do not readily bond to olefins such as form the mat structure 140 and 141. One material that has been found to be particularly suitable for the interface layer 144 is a non-woven polyester fabric having a mass per unit area of about 20 to about 300 grams per square meter, more preferably 50-300. However, other fabric constructions and materials may be used including woven, non-woven or knit constructions incorporating non-olefin materials such as polyester nylon, cotton, aramid and the like.

As illustrated in FIGS. 11A and 12A, the woven tape composite 158 (FIG. 12A) and the unidirectional composite 458 (FIG. 12B) may be applied in laminate relation across a surface of a substrate material 170 such as adhesive, resin, foam, plastic, rubber, or the like with the interface layer 144 and the projecting portions of the stitching yarns 146 providing secure attachment. By way of example only, and not limitation, exemplary substrate materials that are bondable to such a formed composite may include polyurethane, acrylic, methacrylic, epoxy, hot melt, cyanoacrylate, phenolics, unsaturated polyester resins, melamine and combinations thereof. Such materials typically exhibit poor adhesion relative to the mat structures 140 and 141, which may be olefin structures. While the substrate material 170 is shown as a single layer, it is likewise contemplated that multiple layers of the same or different material may be used. By way of example only, the substrate material 170 may include an adhesive disposed in contacting relation with the composites 158 and 458 with one or more underlying layers such as foam, rubber or other material.

As illustrated in FIGS. 11B and 12B, one or more additional woven tape layers 120, unidirectional fiber layers 121, woven mat structure 140, or unidirectional mat structure 141 may be placed in covering relation across the face of the composites 158 and 458 facing away from the substrate material 170. Such additional layers thus provide a surface covering over the stitching yarn 146 thereby defining an outer face that is free of projecting yarn segments. Of course, such additional layers are optional and the composites 158 and 458 may define the outer face if desired.

To any extent desired, the composites 158 and 458 may be molded before, after or during application to the substrate. According to one contemplated practice, it is contemplated that the composites 158 or 458 may be applied across the surface of a heat curable substrate 170 such as curable foam with heat and pressure then being applied to mold and fuse the composite 158 while simultaneously curing the substrate 170. Thus, a three-dimensional structure may be formed having matched curvature between the surface and substrate layers with little retained stress. Of course, the composites 158 and 458 and substrate 170 may also be substantially flat as illustrated in FIGS. 11B and 12B.

FIGS. 11C and 12C show the composites 158 and 458 as previously described applied across opposing surfaces of a substrate 170 either with or without additional surface-defining covering layers. In such a construction, the composites 158 and 458 on either side may be either similar or dissimilar depending on the desired environment of use. As with the single side covering, the final structure may be either molded or flat. While the substrate material 170 is shown as a single layer, it is likewise contemplated that multiple layers of the same or different material may be used. By way of example only, the substrate material 170 may include an adhesive disposed in contacting relation with the composites 158 and 458 with one or more underlying layers such as foam, rubber or other material. Of course, the use of additional surface-defining covering layers may be limited to a single side if desired.

It has been found that the incorporation of an interface layer 144 provides an attractive bonding surface for substrate materials 170 without adversely impacting the ability to thermo-form the attached woven mat structure 140 or unidirectional mat structure 141 to complex three dimensional shapes. In this regard it is believed that the mechanical stitching attachment between the mat structures 140 or 141 and the interface layer 144 establishes a mechanical bonding relationship across the intersection that simultaneously holds the layers together while still allowing for localized separations at interstitial zones between the stitching yarns such that pliability is substantially retained.

It is to be understood that any number of techniques other than stitch bonding may be utilized to introduce embedded fiber elements across one or more layers of the mat structures 140 and 141 and any interface layers 144 as may be utilized while still obtaining a desired secure bonding arrangement. By way of example only, and not limitation, in FIG. 13 an alternative formation process is illustrated. As shown, this process corresponds substantially to that illustrated and described in relation to FIGS. 5 and 10 with the exception that the reciprocating needles are replaced by a pair of tufting needles 280 which cooperatively insert and withdraw a stitching yarn 246 through a woven mat structure 220 (or a unidirectional mat structure not shown) as previously described and any interface layer (not shown) as may be desired. Such tufting forms a surface arrangement of projecting yarn elements 250 adapted to facilitate bonding adhesion to various substrates as previously described. Of course, such a process may be used with any of the yarns previously described, but may be most suitable for yarns of relatively high denier. Although the tufted yarns 246 do not incorporate anchoring stitches, they may nonetheless be anchored in place by fusion bonding by subjecting the woven mat structure 220 with the applied tufted yarns to an elevated temperature environment such as a heater 259 sufficient to activate or reactivate the material forming the surface layers 14, 14' thereby causing such material to at least partially encapsulate the fiber yarns and lock them in place.

By way of further example, in FIG. 14 an alternative formation process is illustrated wherein the reciprocating needles are replaced by reciprocating needles 362 of open forked construction. As will be appreciated, the needles 362 are adapted to periodically engage the yarn 346 as previously described at a position above a woven mat structure 320 as previously described and thereafter push that yarn 346 through the woven mat structure 320 and any desired interface layers 144 (not shown). Such insertion forms a surface arrangement of projecting yarn elements 250 adapted to facilitate bonding adhesion to various substrates as previously described. Although the inserted yarns 346 do not incorporate anchoring stitches, they may nonetheless be anchored in place by fusion bonding by subjecting the woven mat structure 320 with the applied tufted yarns to an elevated temperature environment such as a heater 359 sufficient to activate or reactivate the material forming the surface layers 14, 14' thereby causing such material to at least partially encapsulate the embedded fiber elements and lock them in place.

EXAMPLES

Aspects of the invention may be further understood through reference to the following non-limiting examples. In all examples stitching was carried out using a Malimo stitch bonding apparatus forming stitches at a density of 12.5 courses/inch×7 wales/inch using a 150 denier textured polyester stitching yarn.

Example 1

A multiplicity of fusible mono-axially drawn tape elements as previously described having dimensions of 2.2 mm wide×65 microns thick was formed into a twill weave mat fabric with 11 picks and ends per inch. The mat fabric was stitch bonded to a layer of Reemay polyester spunbond style 2440 (2.90 osy) using a Malimo stitch bonding apparatus forming stitches at a density of 12.5 courses/inch×7 wales/inch with a 150 denier textured polyester stitching yarn to form a stitch bonded composite. The stitch bonded composite was stacked in the following layered arrangement:

B Staged unsaturated polyester coated glass mat;
Stitch bonded composite with spunbond facing the coated glass;
20 layers of the twill weave mat fabric sans spunbond;
Stitch bonded composite with spunbond facing away from the 20 layers;
B Staged unsaturated polyester coated glass mat.

The stacked layers were placed in platen press at 295 F. Applied 450 psi pressure. Heated for 15 minutes. Cooled to 150 F. Released pressure and removed from press.

Example 2

A multiplicity of fusible mono-axially drawn tape elements as previously described having dimensions of 2.2 mm wide×65 microns thick was formed into a twill weave mat fabric with 11 picks and ends per inch. The mat fabric was stitch bonded to a layer of Reemay polyester spunbond style 2440 (2.90 osy) using a Malimo stitch bonding apparatus forming stitches at a density of 12.5 courses/inch×7 wales/inch with a 150 denier textured polyester stitching yarn to form a stitch bonded composite. The stitch bonded composite was stacked in the following layered arrangement:

B Staged phenolic saturated Kraft paper (3 layers);
Stitch bonded composite with spunbond facing the paper;
20 layers of the twill weave mat fabric sans spunbond;
Stitch bonded composite with spunbond facing away from the 20 layers;
B Staged phenolic saturated Kraft paper (3 layers).

The stacked layers were placed in a platen press at 285° F. for 4 minutes with 600 psi pressure applied. Then the stacked layers were cooled to 150 F, the pressure released and the layers removed from the press.

Example 3

A multiplicity of fusible mono-axially drawn tape elements as previously described having dimensions of 2.2 mm wide×65 microns thick was formed into a twill weave mat fabric with 11 picks and ends per inch. The mat fabric was stitch bonded to a layer of Reemay polyester spunbond style 2420 (1.85 osy) using a Malimo stitch bonding apparatus forming stitches at a density of 12.5 courses/inch×7 wales/inch with a 150 denier textured polyester stitching yarn to form a stitch bonded composite. The stitch bonded composite was stacked in the following layered arrangement:

Stitch bonded Composite
9 layers of the twill weave mat fabric sans spunbond;

The stacked arrangement with the spunbond facing out was placed in a platen press at 300 F, applied 300 psi pressure and heated 1 minute. The structure was then cooled to 200 F, released pressure and removed from press.

A 10 cm×10 cm sample of the aforementioned consolidated sheet was placed in an equivalent sized mold with the spunbond surface facing up. 18 g Tectrade Desmodur 44U20L isocyanate and 15 g Tecphen P-42A-140 CP polyol were mixed, and this polyurethane foam mixture was poured onto the sheet in the mold. Another sample of the aforementioned consolidated sheet with the spunbond surface facing the foam precursor was placed in the mold, and the mold was closed to limit the composite thickness to 1 inch. The foam expanded and set. The resultant composite was demolded after 30 minutes.

Example 4

A multiplicity of fusible mono-axially drawn tape elements as previously described having dimensions of 2.2 mm wide×65 microns thick was formed into a twill plain weave mat fabric with 11 picks and ends per inch. The mat fabric was stitch bonded to a layer of Reemay polyester spunbond style 2440 (2.90 osy) using a Malimo stitch bonding apparatus forming stitches at a density of 12.5 courses/inch×7 wales/inch with a 150 denier textured polyester stitching yarn to form a stitch bonded composite. The stitch bonded composite was stacked in the following layered arrangement:

Stitch bonded composite with spunbond facing the paper;
19 layers of the twill weave mat fabric sans spunbond.

The stacked arrangement with the spunbond facing out was placed in a platen press at 300 F, applied 300 psi pressure and heated 2 minutes. The structure was then cooled to 200 F, released pressure and removed from press.

A 10 cm×10 cm specimen of the aforementioned consolidated sheet was placed in an equivalent sized mold with the spunbond layer facing up. 18 g Tectrade Desmodur 44U20L isocyanate and 15 g Tecphen P-42A-140 CP polyol were mixed, and this polyurethane foam mixture was poured onto the sheet in the mold. Another specimen of the consolidated sheet with the spunbond layer facing the foam precursor was placed in the mold, and the mold was closed to limit the composite thickness to 1 inch. The foam expanded and set. The resultant composite was demolded after 30 minutes.

Example 5

A multiplicity of fusible mono-axially drawn tape elements as previously described having dimensions of 2.2 mm wide×65 microns thick was formed into a twill weave mat fabric with 11 picks and ends per inch. The mat fabric was stitch bonded to a layer of Reemay polyester spunbond style 2440 (2.90 osy) using a Malimo stitch bonding apparatus forming stitches at a density of 12.5 courses/inch×7 wales/inch with a 150 denier textured polyester stitching yarn to form a stitch bonded composite. The stitch bonded composite was stacked in the following layered arrangement:

3 layers Kraft paper—B staged phenolic saturated Kraft paper;
Stitch bonded composite with spunbond surface facing the paper;
2 layers of the mat fabric in a twill weave sans spunbond.

The stacked arrangement was placed in platen press at 285 F. Applied 450 psi pressure and heated 4 minutes. The structure was then cooled to 200 F and removed from the press.

Example 6

A multiplicity of fusible mono-axially drawn tape elements as previously described having dimensions of 2.2 mm wide×65 microns thick was formed into a twill weave mat fabric with 11 picks and ends per inch. The mat fabric was stitch bonded to a layer of Reemay polyester spunbond style 2420 (1.85 osy) using a Malimo stitch bonding apparatus forming stitches at a density of 12.5 courses/inch×7 wales/inch with a 150 denier textured polyester stitching yarn to form a stitch bonded composite. The stitch bonded composite was stacked in the following layered arrangement:

3 layers Kraft paper—B staged phenolic saturated Kraft paper
Stitch bonded composite with spunbond facing the paper;
2 layers of the mat fabric in a twill weave sans spunbond.

The stacked arrangement was placed in platen press at 285 F. Applied 450 psi pressure and heated 4 minutes. The structure was then cooled to 200 F and removed from press.

Control Example

The following layers were stacked together and consolidated in the in the arrangement as follows:

Layers
3 layers Kraft paper—B staged phenolic saturated Kraft paper
2 layers of the mat fabric in a twill weave sans spunbond.

Consolidation Process
Placed in platen press at 285 F. Applied 450 psi pressure. Heated 4 minutes. Cooled to 200 F. Released pressure and removed from press.

Peel Strength Data
Samples were tested using a 1"×6" sample peeled at 90 degrees (ASTM D5170). The average peel force required to separate the MFT and tie layer from the Kraft paper is reported.

| Sample | Average Peel (lbf) |
| --- | --- |
| Control Example | 0.0 |
| Example 5 | 1.9 |
| Example 6 | 2.1 |

The control example demonstrates the dramatic increase in adhesion achieved using the intermediate attachment layer.

While the present invention has been illustrated and described in relation to certain potentially preferred embodiments and practices, it is to be understood that the illustrated and described embodiments and practices are illustrative only and that the present invention is in no event to be limited thereto. Rather, it is fully contemplated that modifications and variations to the present invention will no doubt occur to those of skill in the art upon reading the above description and/or through practice of the invention. It is therefore intended that the present invention shall extend to all such modifications and variations as may incorporate the broad aspects of the present invention within the full spirit and scope of the following claims and all equivalents thereto.

The invention claimed is:

1. A composite construction comprising:

a mat structure comprising a plurality of layers, each layer comprising a plurality of monoaxially drawn tape elements, said tape elements comprising a base layer of a strain oriented olefin polymer disposed between covering layers of a heat fusible olefin polymer, wherein said covering layers are characterized by a softening temperature below that of the base layer to permit fusion bonding upon application of heat, and wherein the plurality of layers are fused together;

a multiplicity of embedded fiber elements extending in anchored relation across the thickness dimension of the mat structure such that at least a portion of the embedded fiber elements project outwardly from the mat structure and the projecting portions define at least a partial surface covering across a first side of the mat structure and at least a partial surface covering across a second side of the mat structure;

a substrate layer disposed in layered relation to the mat structure in contacting, bonding relation with said first side of the mat structure such that at least a percentage of said portion of embedded fiber elements projecting outwardly from the mat structure is at least partially bonded to a surface portion of the substrate; and, at least one additional layer comprising a plurality of monoaxially drawn tape elements disposed across a second side of the mat structure facing away from the substrate layer such that said at least one additional layer defines an encapsulating barrier layer over the mat structure to substantially cover portions of the embedded fiber elements projecting outwardly from the second side of the mat structure.

2. The composite construction of claim 1, wherein the mat structure comprises at least 10 layers.

3. The composite composition of claim 1, wherein each layer of the monoaxially drawn tape elements are woven or knitted.

4. The composite composition of claim 1, wherein the embedded fiber elements comprise non-olefin material.

5. The composite composition of claim 1, wherein the wherein the multiplicity of embedded fiber elements are stitching yarns extending in stitch-forming anchored relation through one layer of the mat structure.

6. The composite composition of claim 1, wherein said surface portion of the substrate layer comprises an adhesive.

7. A composite construction comprising:

a mat structure comprising a plurality of layers, each layer comprising a plurality of monoaxially drawn tape elements, said tape elements comprising a base layer of a strain oriented olefin polymer disposed between covering layers of a heat fusible olefin polymer, wherein said covering layers are characterized by a softening temperature below that of the base layer to permit fusion bonding upon application of heat, and wherein the plurality of layers are fused together;

a multiplicity of embedded fiber elements extending in anchored relation across the thickness dimension of the mat structure such that at least a portion of the embedded fiber elements project outwardly from the mat structure and the projecting portions define at least a partial surface covering across a first side of the mat structure and at least a partial surface covering across a second side of the mat structure;

a substrate layer disposed in layered relation to the mat structure in contacting, bonding relation with said first side of the mat structure such that at least a percentage of said portion of embedded fiber elements projecting outwardly from the mat structure is at least partially bonded to a surface portion of the substrate layer; and, at least one additional layer comprising a plurality of fibers arranged substantially parallel to one another along a common fiber direction disposed across a second side of the mat structure facing away from the substrate layer such that said at least one additional layer defines an encapsulating barrier layer over the mat structure to substantially cover portions of the embedded fiber elements projecting outwardly from the second side of the mat structure.

8. A composite construction comprising:

a mat structure comprising a plurality of layers, each layer comprising a plurality of monoaxially drawn tape elements, said tape elements comprising a base layer of a strain oriented olefin polymer disposed between covering layers of a heat fusible olefin polymer, wherein said covering layers are characterized by a softening temperature below that of the base layer to permit fusion bonding upon application of heat, and wherein the plurality of layers are fused together;

at least one interface layer disposed in layered relation to a first side of the mat structure;

a multiplicity of embedded fiber elements extending in anchored relation across the thickness dimension of the mat structure and the interface layer such that at least a portion of the embedded fiber elements project outwardly from the interface layer and at least a portion of the fiber elements project outwardly from a second side of the mat structure, the interface layer in combination with said portion of the embedded fiber elements projecting outwardly from the interface layer defining at least a partial covering across the mat structure;

a substrate layer disposed in layered relation to the mat structure in contacting, bonding relation with said interface layer such that at least a percentage of said interface layer is at least partially bonded to a surface portion of the substrate layer; and, at least one additional layer comprising a plurality of fibers arranged substantially parallel to one another along a common fiber direction disposed across a second side of the mat structure facing away from the substrate layer such that said at least one additional layer defines an encapsulating barrier layer over the mat structure to substantially cover portions of the embedded fiber elements projecting outwardly from the second side of the mat structure.

9. The composite composition of claim 8, wherein the multiplicity of embedded fiber elements are stitching yarns extending in stitch-forming anchored relation at least partially across the mat structure and the interface layer such that at least a portion of the stitching yarns project outwardly from the interface layer, the interface layer in combination with said portion of the embedded fiber elements projecting outwardly from the interface layer defining at least a partial covering across the mat structure.

10. The composite composition of claim 8, wherein the interface layer comprises a non-woven textile.

11. The composite composition of claim 8, wherein the wherein the multiplicity of embedded fiber elements are stitching yarns extending in stitch-forming anchored relation through one layer of the mat structure.

12. A composite construction comprising:
a mat structure comprising at least 2 layers, at least one layer comprising plurality of fibers arranged substantially parallel to one another along a common fiber direction;
a multiplicity of embedded fiber elements extending in anchored relation across the thickness dimension of the mat structure such that at least a portion of the embedded fiber elements project outwardly from the mat structure and the projecting portions define at least a partial surface covering across a first side of the mat structure and at least a partial surface covering across a second side of the mat structure;
a substrate layer disposed in layered relation to the mat structure in contacting, bonding relation with said first side of the mat structure such that at least a percentage of said portion of embedded fiber elements projecting outwardly from the mat structure is at least partially bonded to a surface portion of the substrate layer; and,
at least one additional layer comprising a plurality of monoaxially drawn tape elements disposed across a second side of the mat structure facing away from the substrate layer such that said at least one additional layer defines an encapsulating barrier layer over the mat structure to substantially cover portions of the embedded fiber elements projecting outwardly from the second side of the mat structure.

13. The composite construction of claim 12, wherein the mat structure comprises at least 10 layers and the plurality of layers are fused together.

14. The composite composition of claim 12, wherein the plurality of fibers have a tenacity of at least 10 gram/denier.

15. The composite composition of claim 12, wherein the multiplicity of embedded fiber elements are stitching yarns extending in stitch-forming anchored relation at least partially across the mat structure.

16. The composite composition of claim 12, wherein said surface portion of the substrate layer comprises an adhesive.

17. A composite construction comprising:
a mat structure comprising at least 2 layers, at least one layer comprising plurality of fibers arranged substantially parallel to one another along a common fiber direction;
at least one interface layer disposed in layered relation to a first side of the mat structure;
a multiplicity of embedded fiber elements extending in anchored relation across the thickness dimension of the mat structure and the interface layer such that at least a portion of the embedded fiber elements project outwardly from the interface layer and at least a portion of the fiber elements project outwardly from a second side of the mat structure, the interface layer in combination with said portion of the embedded fiber elements projecting outwardly from the interface layer defining at least a partial covering across the mat structure;
a substrate layer disposed in layered relation to the mat structure in contacting, bonding relation with said interface layer such that at least a percentage of said interface layer is at least partially bonded to a surface portion of the substrate layer; and,
at least one additional layer comprising a plurality of monoaxially drawn tape elements disposed across a second side of the mat structure facing away from the substrate layer such that said at least one additional layer defines an encapsulating barrier layer over the mat structure to substantially cover portions of the embedded fiber elements projecting outwardly from the second side of the mat structure.

18. The composite composition of claim 17, wherein the multiplicity of embedded fiber elements are stitching yarns extending in stitch-forming anchored relation at least partially across the mat structure and the interface layer such that at least a portion of the stitching yarns project outwardly from the interface layer, the interface layer in combination with said portion of the embedded fiber elements projecting outwardly from the interface layer defining at least a partial covering across the mat structure.

19. The composite composition of claim 17, wherein the interface layer comprises a non-woven textile.

* * * * *

UNITED STATES PATENT AND TRADEMARK OFFICE
CERTIFICATE OF CORRECTION

| | |
|---|---|
| PATENT NO. | : 7,294,384 B2 |
| APPLICATION NO. | : 11/518965 |
| DATED | : November 13, 2007 |
| INVENTOR(S) | : Eleazer et al. |

It is certified that error appears in the above-identified patent and that said Letters Patent is hereby corrected as shown below:

In column 17, line 52, after the word "substrate" add the word --layer--.

Signed and Sealed this

Twenty-ninth Day of April, 2008

JON W. DUDAS
*Director of the United States Patent and Trademark Office*